United States Patent
Watanabe et al.

(10) Patent No.: US 7,571,178 B2
(45) Date of Patent: Aug. 4, 2009

(54) PROCESS CONTROLLER, PRODUCT INFORMATION COLLECTOR, AND PROCESS TRACER

(75) Inventors: Tsutomu Watanabe, Tokyo (JP); Kenichi Kikuchi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 370 days.

(21) Appl. No.: 10/474,912

(22) PCT Filed: May 22, 2002

(86) PCT No.: PCT/JP02/04926

§ 371 (c)(1),
(2), (4) Date: Oct. 16, 2003

(87) PCT Pub. No.: WO02/095515

PCT Pub. Date: Nov. 28, 2002

(65) Prior Publication Data

US 2004/0139101 A1 Jul. 15, 2004

(30) Foreign Application Priority Data

May 24, 2001 (JP) ............................. 2001-154929
Apr. 25, 2002 (JP) ............................. 2002-123292

(51) Int. Cl.
G06F 17/00 (2006.01)

(52) U.S. Cl. .................. 707/102; 707/104.1; 707/1; 707/7; 705/26; 705/27; 705/23

(58) Field of Classification Search ............. 707/1, 707/7, 102; 705/26–27, 23
See application file for complete search history.

(56) References Cited

U.S. PATENT DOCUMENTS 4,408,291 A 10/1983 Gunzberg et al.
5,117,096 A 5/1992 Bauer et al.

(Continued)

FOREIGN PATENT DOCUMENTS

DE 197 04 210 A1 8/1998

(Continued)

OTHER PUBLICATIONS

Office Action, Decision of Refusal issued by the Japanese Patent Office for Japanese Patent Application No. 2002-123292 on Oct. 19, 2007, pp. 1-3.

*Primary Examiner*—Don Wong
*Assistant Examiner*—Binh V Ho
(74) *Attorney, Agent, or Firm*—Staas & Halsey LLP

(57) ABSTRACT

With a structure of preparing a process step management apparatus (3a) corresponding to a process step, the date and time information on the input of a product to the process step of the process step management apparatus and the date and time information on the output of the product from the process step of the process step management apparatus are recorded on a record medium attached to the product while maintaining the correspondence to the identification information on the process step management apparatus. Thus, the enumerated data of the identification information on the process step management apparatus (3a) corresponding to the process step in which the product is handled, and the date and time information on the input and output of the product in the process steps is recorded on the record medium. When the processing history of the product is required, the processing information on each process step of the product to be handled can be collected by issuing inquiries to each process step management apparatus (3a) pointed to by the device identification information read from the record medium with the date and time information on input and output of a product read from the record medium specified.

24 Claims, 26 Drawing Sheets

U.S. PATENT DOCUMENTS

| | | |
|---|---|---|
| 5,223,844 A | 6/1993 | Mansell et al. |
| 5,557,096 A | 9/1996 | Watanabe et al. |
| 5,586,038 A | 12/1996 | Nagaoka |
| 5,971,587 A | 10/1999 | Kato et al. |
| 6,082,620 A * | 7/2000 | Bone, Jr. ................ 235/462.16 |
| 6,148,291 A | 11/2000 | Radican |
| 2002/0047781 A1* | 4/2002 | Fallah .................... 340/572.1 |
| 2002/0087867 A1* | 7/2002 | Oberle et al. ............... 713/183 |
| 2002/0156688 A1* | 10/2002 | Horn et al. .................... 705/26 |
| 2003/0132298 A1* | 7/2003 | Swartz et al. .......... 235/472.02 |
| 2004/0177002 A1* | 9/2004 | Abelow ....................... 705/14 |
| 2005/0038758 A1* | 2/2005 | Hilbush et al. .............. 705/402 |

FOREIGN PATENT DOCUMENTS

| | | |
|---|---|---|
| GB | 2 308 947 A | 7/1997 |
| JP | 61-257746 | 11/1986 |
| JP | 62-114860 | 5/1987 |
| JP | 2-131847 | 5/1990 |
| JP | 6-203040 | 7/1994 |
| JP | 10-289278 | 10/1998 |
| JP | 11-144012 | 5/1999 |
| JP | 2000-48066 | 2/2000 |
| JP | 2000-048066 | 2/2000 |
| JP | 2000-123073 | 4/2000 |
| JP | 2000-304620 | 11/2000 |
| JP | 2001-14504 | 1/2001 |
| JP | 2002-022177 | 1/2002 |
| JP | 2002-029615 | 1/2002 |
| JP | 2002-087536 | 3/2002 |
| WO | WO 94/14133 | 6/1994 |
| WO | WO 96/13015 | 5/1996 |
| WO | WO 96/21203 | 7/1996 |
| WO | WO 01/29761 A1 | 4/2001 |

* cited by examiner

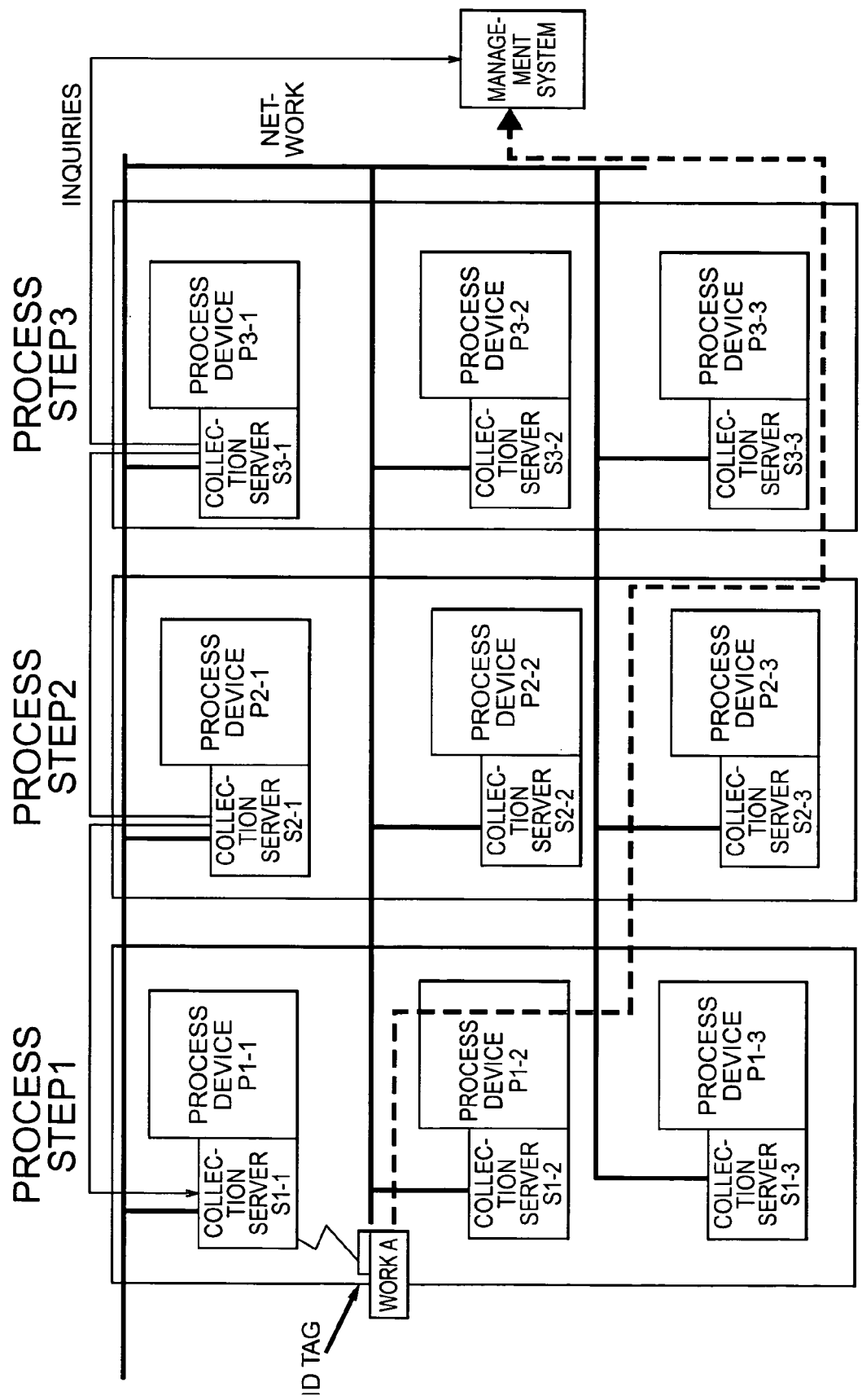

PROCESS CONTROLLER, PRODUCT INFORMATION COLLECTOR, AND PROCESS TRACER

TECHNICAL FIELD

The present invention relates to a process step management apparatus used in a process such as a distribution process, a production process, etc., a product information collecting apparatus for collecting processing information on a product handled in the process, and a process step tracking apparatus for tracking the process steps of the product handled in the process.

BACKGROUND ART

Recently, from the viewpoint of a quality guarantee, there have been an increasing number of requests to obtain the information on the current processing and status of each product handled in a production process and a distribution process, and also the information on the processing and status of the product in the past.

When the flow of process steps are fixed and the flow speed is constant, it is relatively easy to obtain the above-mentioned information can be easily obtained relatively.

For example, in the production process, the flow of process steps is fixed, and the flow speed is constant. The product is handled with the temperature and other conditions controlled in each process step, and it is relatively easy to obtain the above-mentioned information in real time.

Thus, in the process in which the flow of process steps dynamically changes depending on the type of product, the state of process steps, etc., or the flow speed dynamically changes, it is very difficult to obtain the above-mentioned information, and it is almost impossible to obtain the information in real time.

For example, in the distribution process in which products widely delivered to various areas in the world in frozen storage, it is necessary to know the distribution route of each product, and the information (on the temperature control in warehouses, etc.) on the temperature control in each process step in the distribution route so that the frozen storage state of each product can be correctly obtained. However, since the flow of process steps dynamically changes depending on the type of products and the status of the process steps, or the flow speed greatly changes depending on the traffic conditions, etc., it is very difficult to obtain the above-mentioned information, and it is almost impossible to obtain the information in real time.

Thus, in the process in which the current flow of process steps dynamically changes depending on the type of product and the state of process steps, or the flow speed dynamically changes, it is practically not known in real time or in non-real time how each specified product is currently being handled or in what state it enters, or how it has been handled and what state it has entered.

Under the circumstances, the technology of managing a processing history and obtaining the information as to how each specified product is currently being handled or in what state it enters, or how it has been handled and what state it has entered in the process in which the current flow of process steps dynamically changes depending on the type of product and the state of process steps, or the flow speed dynamically changes is greatly demanded.

When the technology of managing a processing history is generated according to the conventional technology, a central management server is provided, processing information for a product is collected in each process step, and the processing information is collected and managed by the central management server.

With the popularization of the Internet, processing information can be easily collected from a number of warehouses all over the world. Therefore, it is possible to realize the structure for the above-mentioned processing history management.

However, with the above-mentioned conventional management structure, the communications load of a central management server is enormously large, and the memory requirements for the central management server are extravagantly large.

Under the circumstances, the present invention aims at configuring a new process step managing technology of easily collecting the processing history of each product in the process in which the flow of process steps dynamically changes depending on the type of product and the state of process step, or the flow speed dynamically changes.

DISCLOSURE OF THE INVENTION

A process step management apparatus of the present invention is provided corresponding to a process step in which a product handled in a preceding process step is input and then output after predetermined processing, and includes: means for detecting input of a product to a process step which is managed by the process step management apparatus; means for detecting output of the product from the process step which is managed by the process step management apparatus; means for obtaining date and time information on the input of the product and date and time information on the output of the product; means for reading product identification information recorded on a record medium attached to the product; means for storing the read product identification information and the obtained date and time information on the input and output in a storage device, the read product identification information and the obtained date and time information maintaining a correspondence with each other; and means for recording the obtained date and time information on the input and output and identification information on the process step management apparatus in the record medium, the obtained date and time information and identification information maintaining a correspondence with each other.

Corresponding to the feature of the process step management apparatus of the present invention, for collecting processing information on the processing performed on a product handled in a plurality of process steps, a product information collecting apparatus of the present invention includes: means for reading from a record medium, which stores enumerated data by a process step management apparatus of the present invention and is attached to the product to be handled, identification information on a process step management apparatus and input/output date and time information on the product to be handled in a process step; and means for collecting processing information on each process step performed on a product to be handled by issuing inquiries to the process step management apparatus pointed to by read device identification information with the read input/output date and time information specified.

Corresponding to the feature of the process step management apparatus of the present invention, for tracking the process steps in which a product are handled, a process step tracking apparatus of the present invention includes: means for determining whether or not a product to be tracked has been handled by issuing inquiries to the process step management apparatus of the present invention with the identification information on a product to be tracked specified, and collecting input/output date and time information if the product has been handled; and means for specifying, according to the collected information, the information on the current process step in which the product to be tracked is being handled, and the information on a process step order in which the product to be tracked has been handled.

With the above-mentioned feature, according to the present invention, pair data of the input/output date and time information on a process step and identification information on the process step management apparatus are recorded on a record medium in each process step of a process using the process step management apparatus with a record medium capable of reading and writing data attached to a product to be handled, thereby allowing, for example, the product information collecting apparatus provided at the last stage of the process to specify the input/output date and time information recorded on the record medium, issue inquiries to the process step management apparatus recorded on the record medium, and collect a processing history of a product.

Then, according to the present invention, each of the process step management apparatus stores pair data of product identification information and input/output date and time information recorded on a record medium in its own storage device, thereby allowing the process step tracking apparatus to issue inquiries to each of the process step management apparatus with the product identification information specified, collect the information as to whether or not the product pointed to by the product identification information has been handled, and collect the processing history about the product.

On the other hand, when it is necessary to track in real time the process step through which a product handled in a process has passed, a process step management apparatus of the present invention, which is in correspondence to the step in which a product handled in a preceding process step is input, is handled in predetermined processing and is output, includes: means for detecting input of a product to the process step management apparatus; means for detecting output of a product from the process step management apparatus; means for reading identification information on the product and destination address information recorded on a tag attached to a product; and means for notifying the process step tracking apparatus of the present invention pointed to by the read destination address information of the identification information of the process step management apparatus and of input/output of a product pointed to by the read product identification information.

Corresponding to the feature of the process step management apparatus of the present invention, for tracking in real time the process steps in which a product is handled, a process step tracking apparatus of the present invention includes: means for receiving information on product identification information and the device identification information given from the process step management apparatus of the present invention according to the destination address information recorded on a tag attached to a product; and means for chasing a process step through which a product pointed to by product identification information has passed based on the received device identification information and time-series data of pair data of product identification information and date and time information on a product input and output in a process step.

With the above-mentioned feature, according to the present invention, the process step management apparatus notifies the process step tracking apparatus pointed to by destination address information recorded on a readable tag, which is attached to a product handled in a process and stores destination address information, in each process step of a process of input/output of the product, there by allowing the process step tracking apparatus to track the product being handled in the current process step in real time and track what the process steps are like that the product was put through up to now.

BRIEF DESCRIPTION OF THE DRAWINGS

FIG. 26 shows an example of a production process to which the present invention is applied.

BEST MODE FOR CARRYING OUT THE INVENTION

First, the outline of the first embodiment is described, the second embodiment is then described, and the details of the first and second embodiments are described.

[1] Outline of the First Embodiment

Figure 1:
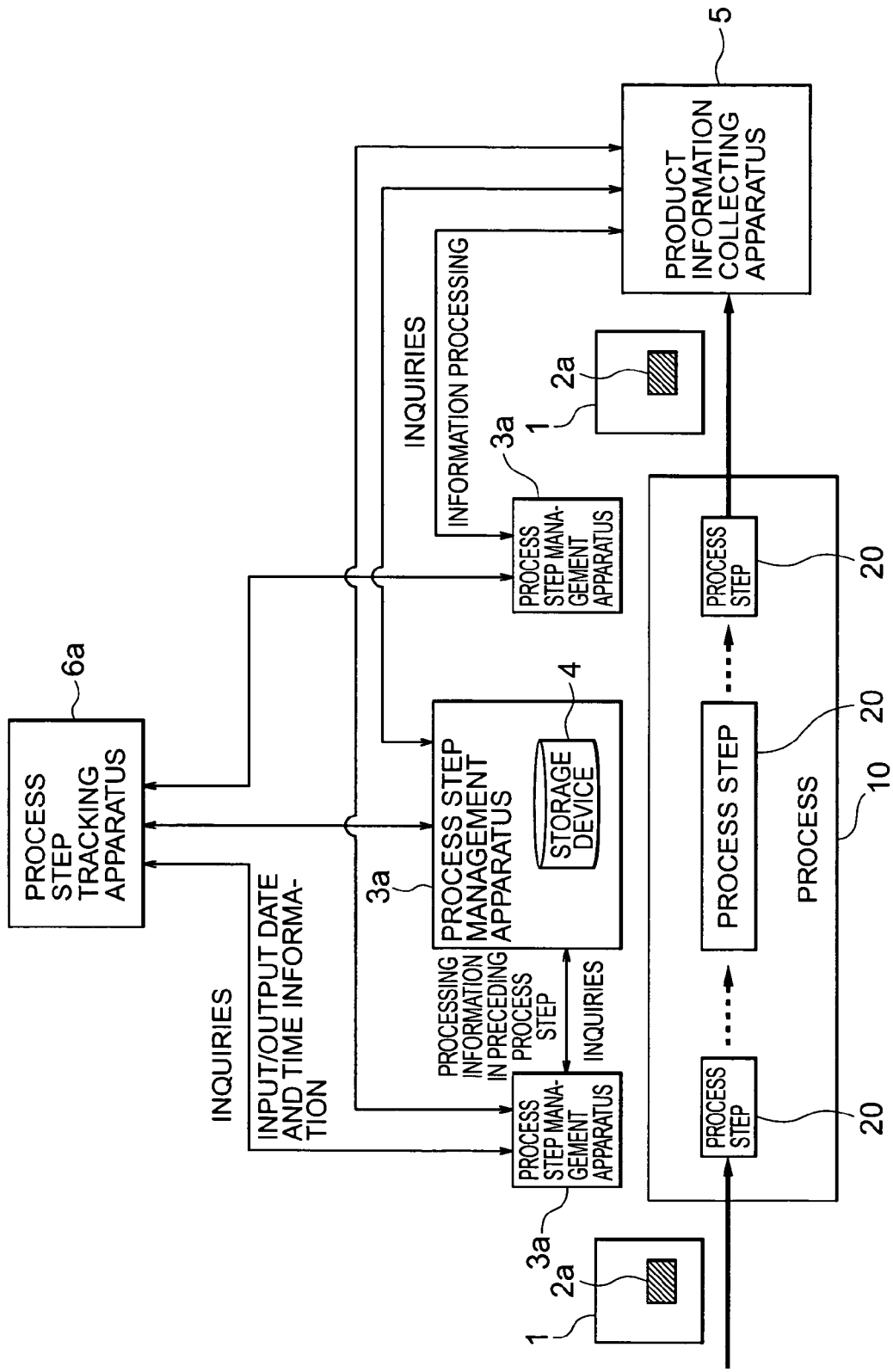
FIG. 1 shows the general structure of the first embodiment of the present invention.

FIG. 1 shows the outline of the structure of the first embodiment.

In FIG. 1, a product 1 is a target to which the present invention is applied. A readable/writable record medium 2a is attached to the product 1, and the product 1 is handled in a process 10 in which the flow of process steps is dynamically changed depending on the type of product, the state of process steps, etc., and corresponding processing is performed in a plurality of process steps 20 of the process 10.

A process step management apparatus 3a comprising the present invention is provided corresponding to each of the process steps 20 of the process 10, and performs the processing to collect processing information performed on the product 1 in the process steps 20.

A product information collecting apparatus 5 comprising the present invention collects the processing information performed on the product 1 output from the process 10.

A process step tracking apparatus 6a comprising the present invention is connected to a process step management apparatus 3a through a network (or networks), and performs the processing to track the process steps 20 through which the product 1 has passed.

The process step management apparatus 3a of the present invention comprises: (a) "input detection means" for detecting input of the product 1 to the process step 20 of (or which is managed by) the process step management apparatus 3a; (b) "output detection means" for detecting output of the product 1 from the process step 20 of the process step management apparatus 3a; (c) "date and time information obtaining means" for obtaining the date and time information when the product 1 is input and obtaining the date and time information when the product 1 is output; (d) "record means" for recording the input/output date and time information obtained by the date and time information obtaining means and the identification information on the process step management apparatus 3a in the record medium 2a attached to the product 1 while maintaining the correspondence between the information; (e) "read means" for reading information recorded on the record medium 2a attached to the product 1; (f) "storage means" for storing in the storage device 4 the product identification information read by the read means and the input/output date and time information obtained by the date and time information obtaining means while maintaining the correspondence between the information while maintaining the correspondence between the information; (g) "preceding process step information obtaining means" for obtaining the processing information on the preceding process step 20 performed on the product 1 input to the process step 20 of the process step management apparatus 3a; and (h) "return means" for returning the information on which the process step tracking apparatus 6a has made inquiries.

The input detection means detects the input of the product 1 itself, and detects the input of the product 1 by detecting the operation of an operator. Additionally, the output detection means detects the output of the product 1 itself, and detects the output of the product 1 by detecting the operation of the operator. The date and time information obtaining means reads the date and time information from the clock, and receives input of the date and time information from an operator, thereby obtaining the date and time information.

Furthermore, the record means is configured by, for example, a program recording information on the record medium 2a by controlling the writing system configured by hardware, and can record the information on a storage position of input/output date and time information instead of recording the input/output date and time information obtained by the date and time information obtaining means. The read means is configured by, for example, a program reading necessary information from the information read by the read system configured by hardware. The storage device 4 also stores trend data, etc. such as a temperature, etc. which is the processing information on the process step 20 of the process step management apparatus 3a in addition to the above-mentioned information.

On the other hand, the product information collecting apparatus 5 of the present invention comprises (a) "read means" for reading information recorded on the record medium 2a attached to the product 1, and (b) "collection means" for collecting the processing information on each of the process steps 20 about the product 1 output from the process 10 using the information read by the read means.

The read means is configured by, for example, a program for reading necessary information from the information read by a reading system configured by hardware.

On the other hand, the process step tracking apparatus 6a of the present invention comprises (a) "collection means" for collecting the information as to whether or not the product 1 to be tracked has been handled by issuing inquiries to each process step management apparatus 3a, and collecting the input/output date and time information on the product 1 in the process steps 20 when the product 1 has been handled, and (b) "designation means" for specifying the information as to in which process step 20 the product 1 to be tracked is currently being handled according to the information collected by the collection means, and specifying the information on the process step order in which the product 1 to be tracked has been handled.

The "collection means" can further collect the processing information performed on the product 1 to be tracked specified by the collected input/output date and time information from each of the process step management apparatus 3a from which the input/output date and time information is collected.

In the first embodiment with the above-mentioned structure, the process step management apparatus 3a of the present invention records in the record medium 2a attached to the product 1 the date and time information on the input of the product 1 to the process step 20 of the process step management apparatus 3a and the date and time information on the output of the product 1 from the process step 20 of the process step management apparatus 3a while maintaining the correspondence between the information and the identification information on itself, i.e. the process step management apparatus 3a.

At this time, the process step management apparatus 3a reads the product identification information recorded on the record medium 2a attached to the product 1, and can store the input/output date and time information on the product 1 in the storage device 4 while maintaining the correspondence between the input/output date and time information and the read product identification information. At this time, the information on the storage position of the input/output date and time information can be recorded on the record medium 2a instead of the input/output date and time information on the product 1.

Thus, the enumerated data of the identification information on the process step management apparatus 3a of the present invention provided corresponding to the process steps 20 and the input/output date and time information (or the information on the storage position) about the product 1 in the process steps 20 are recorded on the record medium 2a attached to the product 1 passing through the process 10.

With the above-mentioned structure, the process step management apparatus 3a of the present invention reads the device identification information and the input/output date and time information (or information on the storage portion of the information) about the preceding process step 20 recorded on the record medium 2a attached to the product 1 if the information on the processing performed in the preceding process step 20 is required when the processing of the process step 20 of the process step management apparatus 3a is performed on the input product 1. Then, the process step management apparatus 3a issues inquiries to another process step management apparatus 3a pointed to by the read device identification information with the read input/output date and time information (or the information on the storage position) specified, thereby obtaining the processing information on the preceding process step 20.

On the other hand, the product information collecting apparatus 5 of the present invention receives the information recorded on the record medium 2a attached to the product 1, and reads the enumerated data of the identification information on the process step management apparatus 3a and the input/output date and time information (or the information on the storage position) about the product 1 in the process steps 20 corresponding to the process step management apparatus 3a from the record medium 2a.

Then, the product information collecting apparatus 5 issues inquiries to the process step management apparatus 3a pointed to by the read device identification information with the read input/output date and time information (or the information on the storage position) specified, thereby collecting the processing information on each of the process steps 20 performed on a product to be handled.

On the other hand, the process step tracking apparatus 6a of the present invention receives the information stored in the storage device 4 of the process step management apparatus 3a, and issues inquiries to each process step management apparatus 3a with the identification information on the product 1 to be tracked specified, thereby collecting the information as to whether or not the product 1 to be tracked has been handled and, if it has been handled, collecting the input/output date and time information, specifying the information as to in which process step 20 the product 1 to be tracked is currently being handled, and specifying the information on the process step order in which the product 1 to be tracked has been handled.

At this time, the process step tracking apparatus 6a collects the processing information on the product 1 to be tracked pointed to by the collected input/output date and time information from each process step management apparatus 3a from which the input/output date and time information is collected, thereby collecting the processing information on the product 1 to be tracked.

Thus, according to the present invention, a processing history about the product 1 in the process 10 in which the flow of the process steps 20 dynamically changes depending on the type of the product 1 and the status of the process steps can be easily obtained.

Then, according to the present invention, when it is necessary to adjust the processing to be performed on the product 1 according to the processing history of the preceding process step 20 in the above-mentioned process 10, the processing history of the preceding process step 20 can be easily obtained.

Additionally, according to the present invention, in the above-mentioned process 10, the processing currently being performed on the product 1 in the process steps 20, and the processing order of the process steps 20 on the product 1 can be easily obtained.

[2] Outline of the Second Embodiment

Although the processing history of the product handled in the process in which the flow of process steps dynamically changes depending on the type of product and the status of process steps can be easily collected, there is still the problem to be solved that the process step tracking apparatus 6a cannot obtain the process steps and the processing history unless the process step tracking apparatus 6a issues inquiries to all process step management apparatuses 3a.

In the second embodiment, information on the process steps through which a product being handled in the process such as a distribution process, a production process, etc. has passed can be tracked in real time.

Figure 2:
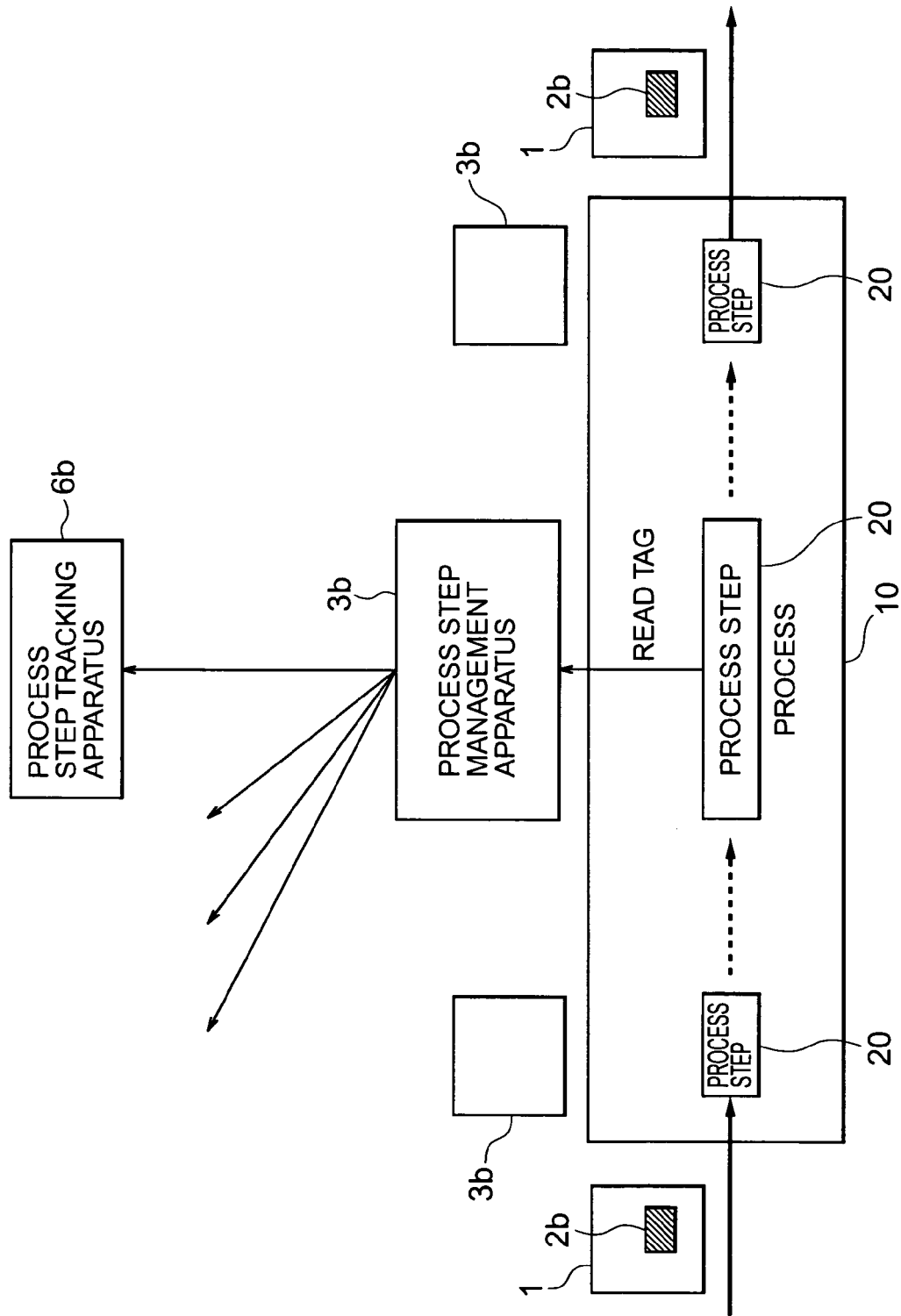
FIG. 2 shows the general structure of the second embodiment of the present invention.

FIG. 2 shows the outline of the structure according to the second embodiment of the present invention.

In FIG. 2, the present invention is applied to the product 1 attached with a tag 2b. The product 1 is put into and handled by the processing in a plurality of process steps 20 of the process 10 in which the flow of process steps dynamically changes depending on the type of product, the status of process steps, etc. and the flow speed dynamically changes.

A process step management apparatus 3b comprising the present invention is associated with each of the process steps 20 of the process 10, and performs the processing to collect the processing information on the product 1 in the process steps 20.

A process step tracking apparatus 6b comprising the present invention is connected to the process step management apparatus 3b through a network, and tracks the process steps 20 through which the product 1 has passed.

For convenience in generating drawings, a specific device is assumed as the process step tracking apparatus 6b. It is not necessary to prepare the process step tracking apparatus 6b as a specific device, but it can be, for example, a terminal operated by an end user for which the product 1 is provided. Furthermore, there can be a plurality of process step tracking apparatuses 6b.

The tag 2b attached to the product 1 to realize the present invention is configured by, for example, a record medium, a piece of paper, etc. from which recorded data can be read. The tag 2b records at least the identification information on the product 1 to which the tag 2b is attached, and the destination address information such as electronic mail addresses of one or more devices (possibly including the subsequent process step management apparatus 3b) including the process step tracking apparatus 6b.

The process step management apparatus 3b of the present invention comprises: (a) "input detection means" for detecting input of the product 1 to the process step 20 of the process step management apparatus 3b; (b) "output detection means" for detecting output of the product 1 from the process step 20 of the process step management apparatus 3b; (c) "read means" for reading the product identification information and the destination address information recorded on the tag 2b attached to the product 1; and (d) "notification means" for notifying the process step tracking apparatus 6b, etc. pointed to by the destination address information read by the read means of the identification information on the process step management apparatus 3b, and notifying it of the input/output of the product 1 pointed to by the product identification information read by the read means.

The input detection means detects the input of the product 1 itself, and detects the input of the product 1 by detecting the operation of an operator. Additionally, the output detection means detects the output of the product 1 itself, and detects the output of the product 1 by detecting the operation of the operator. The read means is configured by, for example, a program reading necessary information from the information read by the read system configured by hardware.

With the above-mentioned structure, the notification means can notify the process step tracking apparatus 6b, etc. pointed to by the destination address information read by the read means of the position information of the process steps 20 of the process step management apparatus 3b obtained by the GPS (global positioning system), etc. according to a predetermined notification code, for example, periodically, etc. during the period from input to output of the product 1.

With the above-mentioned structure, the notification means can notify the process step tracking apparatus 6b, etc. pointed to by the destination address information read by the read means of the processing information of the process step 20 of the process step management apparatus 3b according to a predetermined notification code, for example, periodically, etc. during the period from input to output of the product 1.

On the other hand, the process step tracking apparatus 6b comprises (a) "reception means" for receiving the information on the product identification information and the device identification information received from the process step management apparatus 3b; and (b) "tracking means" for tracking the process steps through which the product pointed to by the product identification information passed based on the time-series data of the pair data of the device identification information and the product identification information received by the reception means and the date and time information transmitted corresponding to the product identification information or the date and time information (date and time information indicating the input and output in the process step 20) about the reception of the product identification information.

With the above-mentioned structure, the tracking means can track the transmission route of the product 1 according to the time-series data of the position information when the position information is transmitted from the process step management apparatus 3b.

With the above-mentioned structure, the tracking means can track the contents of the processing performed on the product 1 according to the time-series data of the processing information when the processing information is transmitted from the process step management apparatus 3b.

According to the second embodiment with the above-mentioned structure, the process step management apparatus 3b of the present invention reads the product identification information and destination address information recorded on the tag 2b attached to the input product 1 when the product 1 is input to the process step 20 of the process step management apparatus 3b, and notifies the process step tracking apparatus 6b, etc. pointed to by the read destination address information of the identification information on the process step management apparatus 3b, and of the input of the product 1 pointed to by the read product identification information.

Then, the process step management apparatus 3b of the present invention reads the product identification information and the destination address information recorded on the tag 2b attached to the output product 1 when the product 1 is output from the process steps 20 of the process step management apparatus 3b, and notifies the process step tracking apparatus 6b, etc. pointed to by the read destination address information of the identification information on the process step management apparatus 3b, and of the output of the product 1 pointed to by the read product identification information.

Upon receipt of the notification, the process step tracking apparatus 6b of the present invention set as a destination on the tag 2b can be immediately informed in which process step 20 each product 1 is being handled, and through which process steps 20 each product 1 has passed according to the time-series data of the notification.

To successfully track the process steps, the process step management apparatus 3b of the present invention has to notify the process step tracking apparatus 6b of the present invention about the date and time information on the input/output in the process steps 20 of the product 1. Since the date and time information can be obtained on the process step tracking apparatus 6b side in synchronization with the reception of the input/output notification, the notification can be omitted.

When the above-mentioned processing is performed, and the process step management apparatus 3b of the present invention is operated with the process step 20 of the process step management apparatus 3b performed during the transportation on a vehicle, etc., the process step management apparatus 3b notifies the process step tracking apparatus 6b, etc. pointed to by the destination address information recorded on the tag 2b of the position information on the process step 20 of the process step management apparatus 3b obtained by the GPS, etc. according to a predetermined notification code for example periodically, during the period from input to output of the product 1.

Upon receipt of the notification, the process step tracking apparatus 6b can also track the transmission route of each product 1.

When the above-mentioned processing is performed, the process step management apparatus 3b of the present invention notifies the process step tracking apparatus 6b, etc. pointed to by the destination address information recorded on the tag 2b of the processing information on the process step 20 of the process step management apparatus 3b according to a predetermined notification code, for example, periodically, upon occurrence of a fault, etc. during the period from input to output of the product 1.

Upon receipt of the notification, the process step tracking apparatus 6b of the present invention can be informed what processing is being performed on each product 1 now, and what processing has been performed on each product 1 up to now according to the time-series data of the notification.

Thus, according to the present invention, the information on the current processing being performed on each product, the current status of each product, the processing so far performed on each product, and the state which each product has entered can be obtained in real time about the product handled in a process in which the flow of process steps dynamically changes depending on the type of product, the status of process step, etc. and the flow speed dynamically changes.

Thus, the following process can be informed in real time of the status of each product, thereby efficiently realizing the preparation for reception of a product.

[3] Details of First and Second Embodiments

Figure 3:
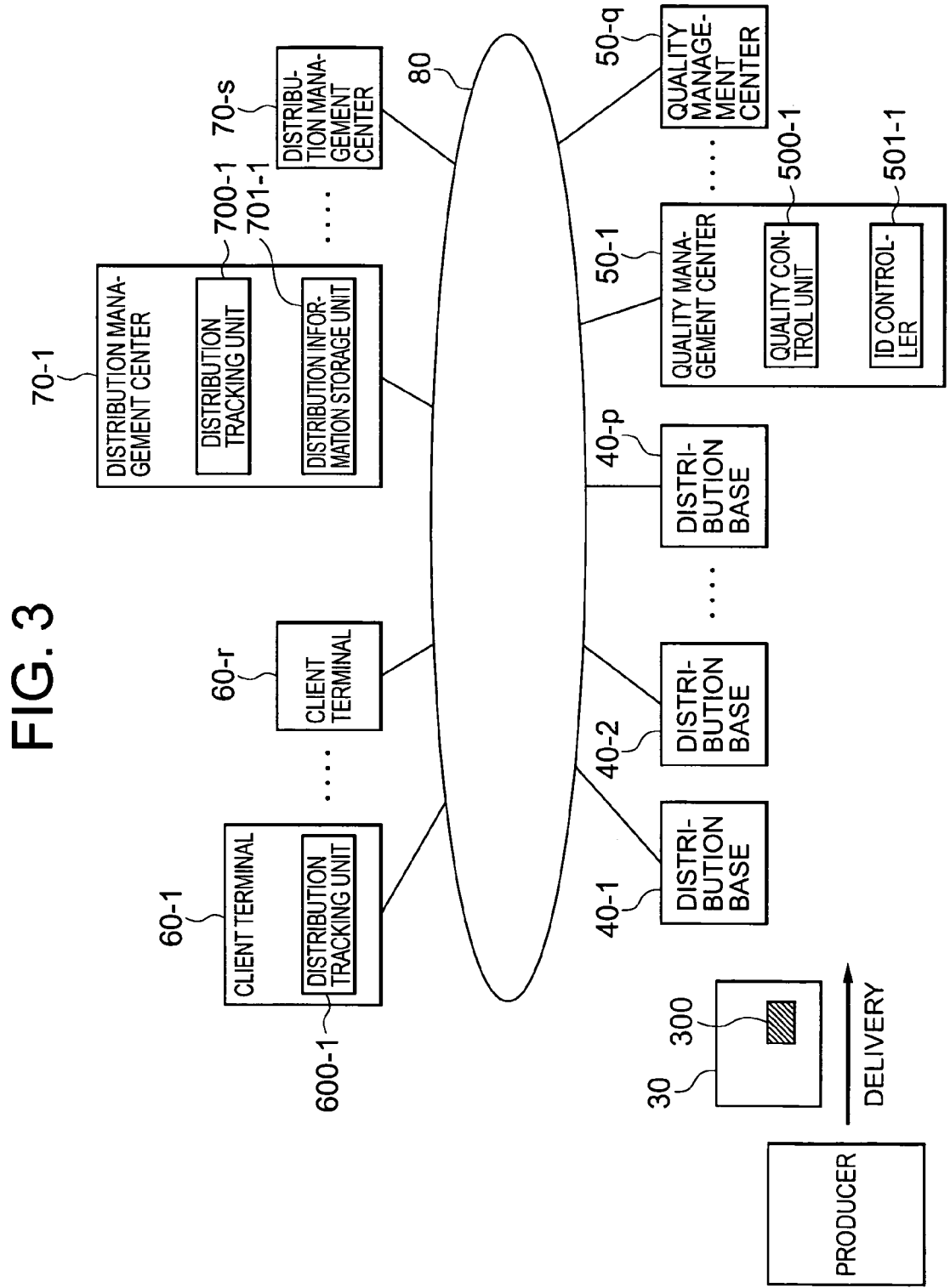
FIG. 3 shows an embodiment of the distribution system comprising to the present invention.

FIG. 3 shows an embodiment of a distribution system to which the present invention is applied.

In FIG. 3, vegetables, etc. are delivered in a distribution case (or container) 30 from a producer. A distribution base 40-$i$ ($i$=1 to p) stores the distribution case 30 to be distributed to a consumer in an appropriate air condition. A quality management center 50-$i$ ($i$=1 to q) collects air-conditioning history information as a storage history of the distribution case 30. A client terminal 60-$i$ ($i$=1 to r) tracks the distribution status of a specified distribution case 30. A distribution management center 70-$i$ ($i$=1 to s) tracks the distribution status of the distribution case 30 in real time. A network 80 connects the distribution base 40-$i$, the quality management center 50-$i$, the client terminal 60-$i$, and the distribution management center 70-$i$.

The distribution base 40-$i$ can be a truck, etc. The quality management center 50-$i$ can be provided in combination with the distribution base 40-$i$, the client terminal 60-$i$, or the distribution management center 70-$i$. The distribution management center 70-$i$ can be provided in combination with the distribution base 40-$i$, the client terminal 60-$i$, or the quality management center 50-$i$.

The above-mentioned first embodiment is realized with the distribution base 40-$i$, the quality management center 50-$i$, and the client terminal 60-$i$, and the above-mentioned second embodiment is realized with the distribution base 40-$i$ and the distribution management center 70-$i$.

In the embodiment shown in FIG. 3, the distribution case 30 of vegetables, etc. delivered from a producer is distributed to a consumer through the distribution base 40-$i$ having an air-conditioning function appropriate for the storage by applying the present invention.

Figure 4:
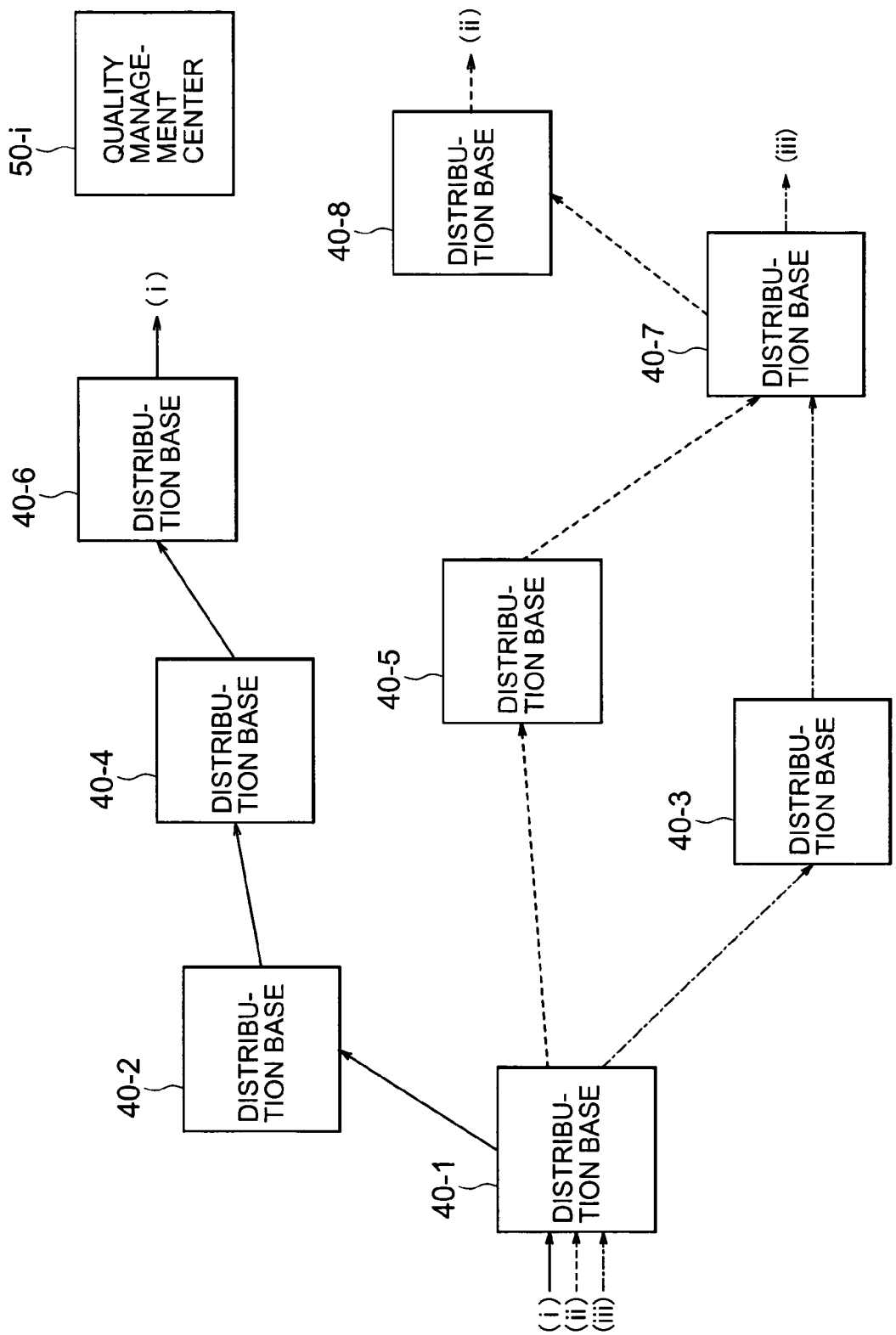
FIG. 4 shows a distribution route.

At this time, the distribution cases 30 are not all distributed to a consumer through the same distribution base 40-$i$, but, as shown in FIG. 4 through different distribution bases 40-$i$ (including different carriages, etc.) depending on the demand situation, the storage situation of the distribution base 40-$i$, etc.

In this embodiment, the air-conditioning history information required in managing the quality of the distribution cases 30 passing through the above-mentioned distribution process is collected during storage of the distribution cases 30. In the embodiment, the information on the distribution bases 40-$i$ through which the distribution case 30 has passed, and the distribution base 40-$i$ in which the distribution case 30 is currently stored is monitored in real time or in non-real time.

To collect the air-conditioning history information and monitor the distribution route, an ID tag 300 configured by a readable and writable record medium such as a magnetic card, etc. is attached to the distribution case 30. To realize the above-mentioned second embodiment only, a readable ID tag 300 is to be attached.

Figure 5:
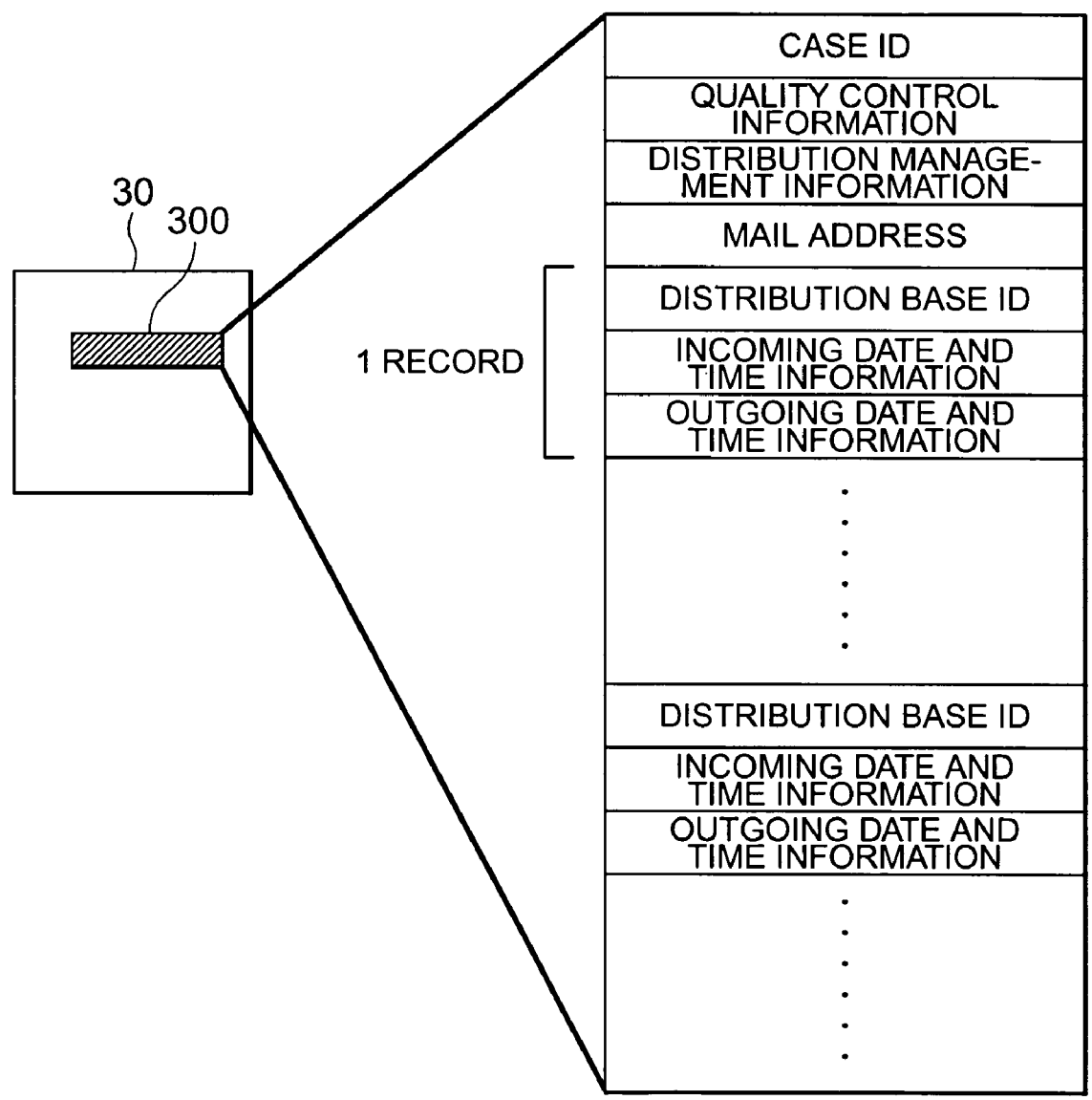
FIG. 5 shows an embodiment of the data recorded on an ID tag.

FIG. 5 shows an embodiment of the data recorded on the ID tag 300 attached to the distribution case 30.

As shown in FIG. 5, the ID tag 300 attached to the distribution case 30 records: (a) a case ID which is an ID of the distribution case 30; (b) the quality control information on vegetables stored in the distribution case 30; (c) the distribution control information on the distribution case 30; (d) the electronic mail address of the device set as a destination of a notification; and (e) enumerated data (in order of storage) including the ID of the distribution base 40-$i$ storing the distribution case 30, the incoming date and time information of the storage in the distribution base 40-$i$, and the outgoing date and time information of the shipment from the distribution base 40-$i$.

The quality control information includes various information on the quality of stored goods such as the name of goods, the name of a producer, the class of a product, a specified distribution route, etc. The distribution control information includes various information on the distribution such as the final distribution base 40-$i$ or destination, and a scheduled arrival time, etc. Furthermore, as known from what is described later, it is desired that the electronic mail address of the distribution base 40-$i$ is used as an ID of the distribution base 40-$i$.

In the descriptions below, for convenience in explanation, an electronic mail address of an arbitrary distribution management center 70-$i$ is used.

It is desired that the data recorded on the ID tag 300 is encoded based on the ID and the password of the transmitter of the distribution case 30. In this case, the transmitter notifies the party having an authorized right of the ID and the password, and the recorded and encoded data is decoded using them. Thus, a person other than the party having the authorized right cannot read or write the data recorded on the ID tag 300, thereby successfully avoiding illegal acts.

Figure 6:
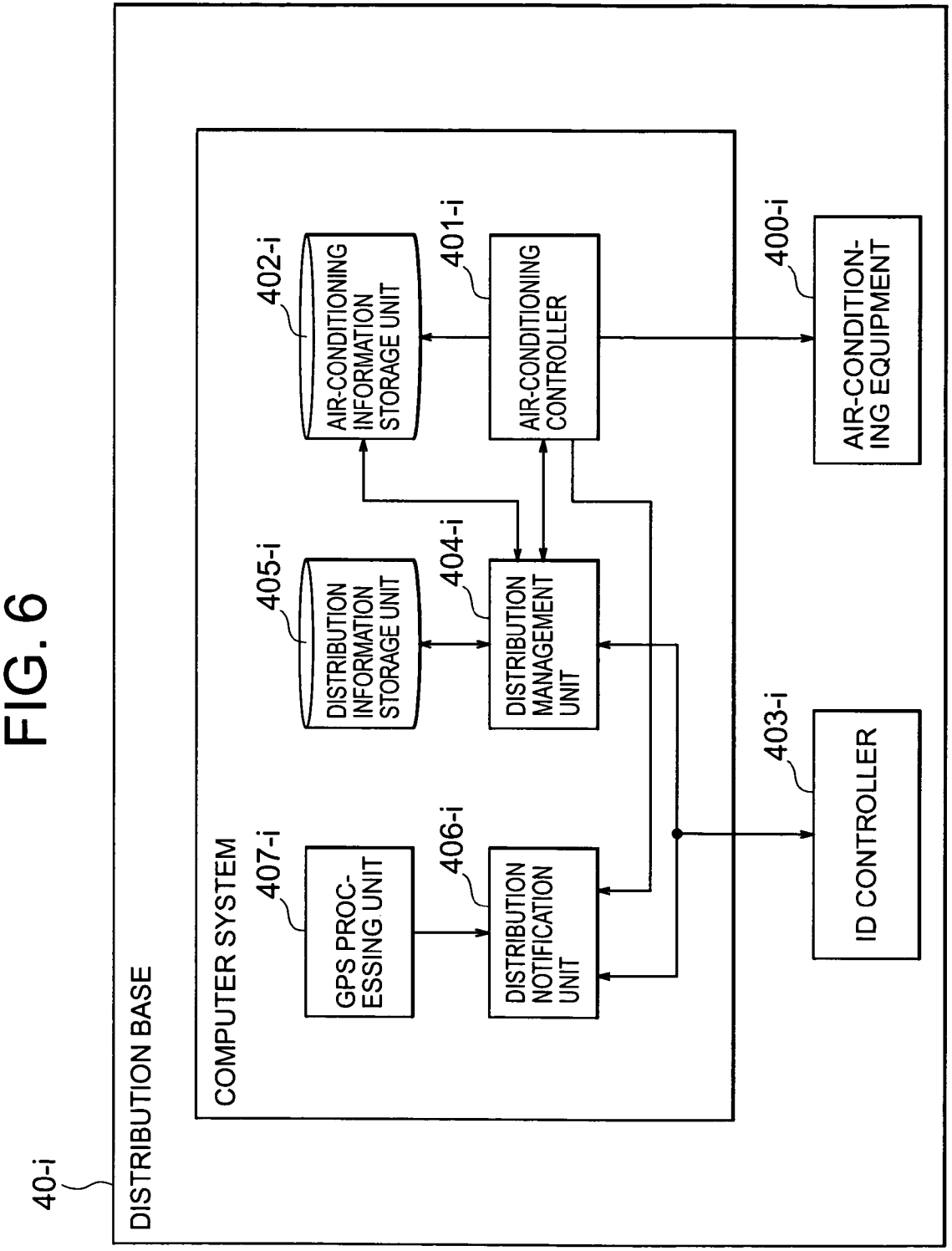
FIG. 6 shows an embodiment of the structure of the device provided for a distribution base.

FIG. 6 shows an embodiment of the structure of the device provided for the distribution base 40-$i$ for realization of the present invention.

As shown in FIG. 6, the distribution base 40-$i$ comprises: an air-conditioning equipment 400-$i$ for adjusting the temperature and humidity in the distribution base 40-$i$; an air-conditioning controller 401-$i$ for controlling the temperature, the humidity, etc. in the distribution base 40-$i$ by controlling the air-conditioning equipment 400-$i$; an air-conditioning information storage unit 402-$i$ for storing the air-conditioning information such as the temperature, the humidity, etc. in the distribution base 40-$i$ controlled by the air-conditioning controller 401-$i$; an ID controller 403-$i$ for reading and writing the ID tag 300; a distribution control unit 404-$i$ for enabling the air-conditioning history information to be collected during storage of the distribution case 30; a distribution information storage unit 405-$i$ for storing the information handled by the distribution control unit 404-$i$; a distribution notification unit 406-$i$ for enabling the distribution route to be monitored in real time using the electronic mail transmission and reception capabilities; and a GPS processing unit 407-$i$ which is provided for movement of the distribution base 40-$i$, has the GPS function, and obtains the position information on the distribution base 40-$i$.

Furthermore, the quality management center 50-$i$ comprises: a quality control unit 500-$i$ for collecting air-conditioning history information during storage of the distribution case 30; and an ID controller 501-$i$ for reading and writing the ID tag 300 as shown in FIG. 3.

The client terminal 60-$i$ comprises a distribution tracking unit 600-$i$ for tracking the distribution status of a specified distribution case 30 as shown in FIG. 3.

The distribution management center 70-$i$ comprises: a distribution tracking unit 700-$i$ for tracking in real time the distribution status of each distribution case 30; and a distribution information storage unit 701-$i$ for storing the information collected by the distribution tracking unit 700-$i$ as shown in FIG. 3.

Figure 7:
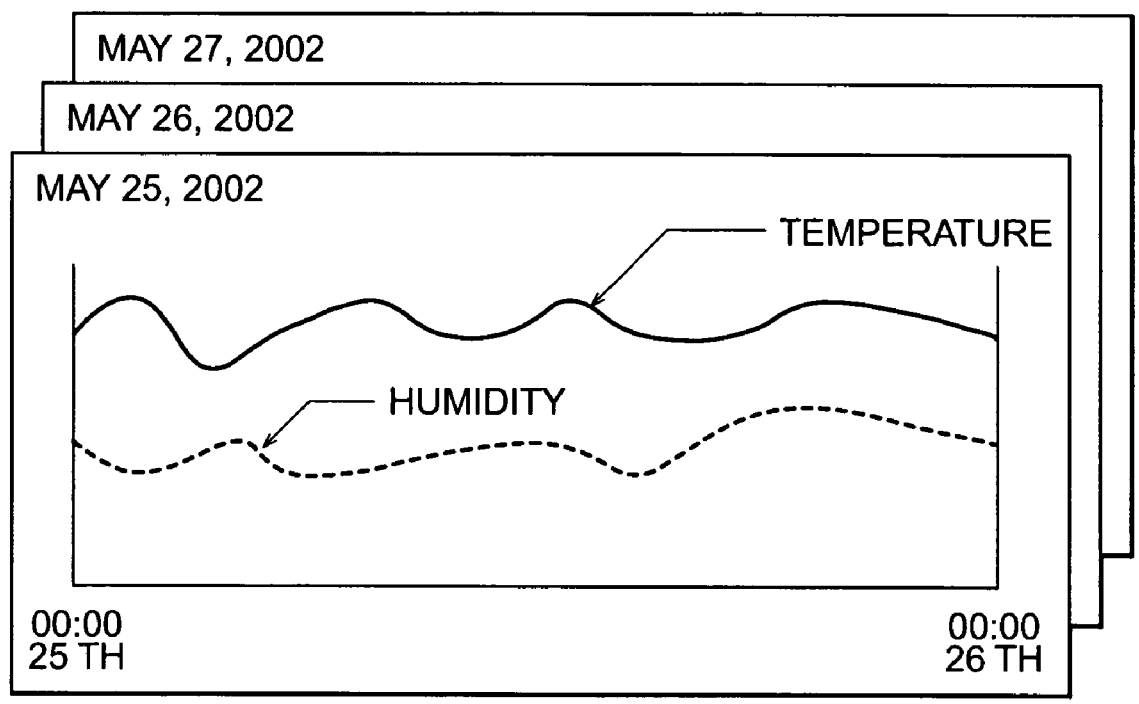
FIG. 7 shows the information stored in the air-conditioning information storage unit of a distribution base.

The air-conditioning information storage unit 402-$i$ provided for the distribution base 40-$i$ stores the air-conditioning information in the distribution base 40-$i$ such as the trend data about the temperature and the humidity in the distribution base 40-$i$ as shown in FIG. 7.

Figure 8:
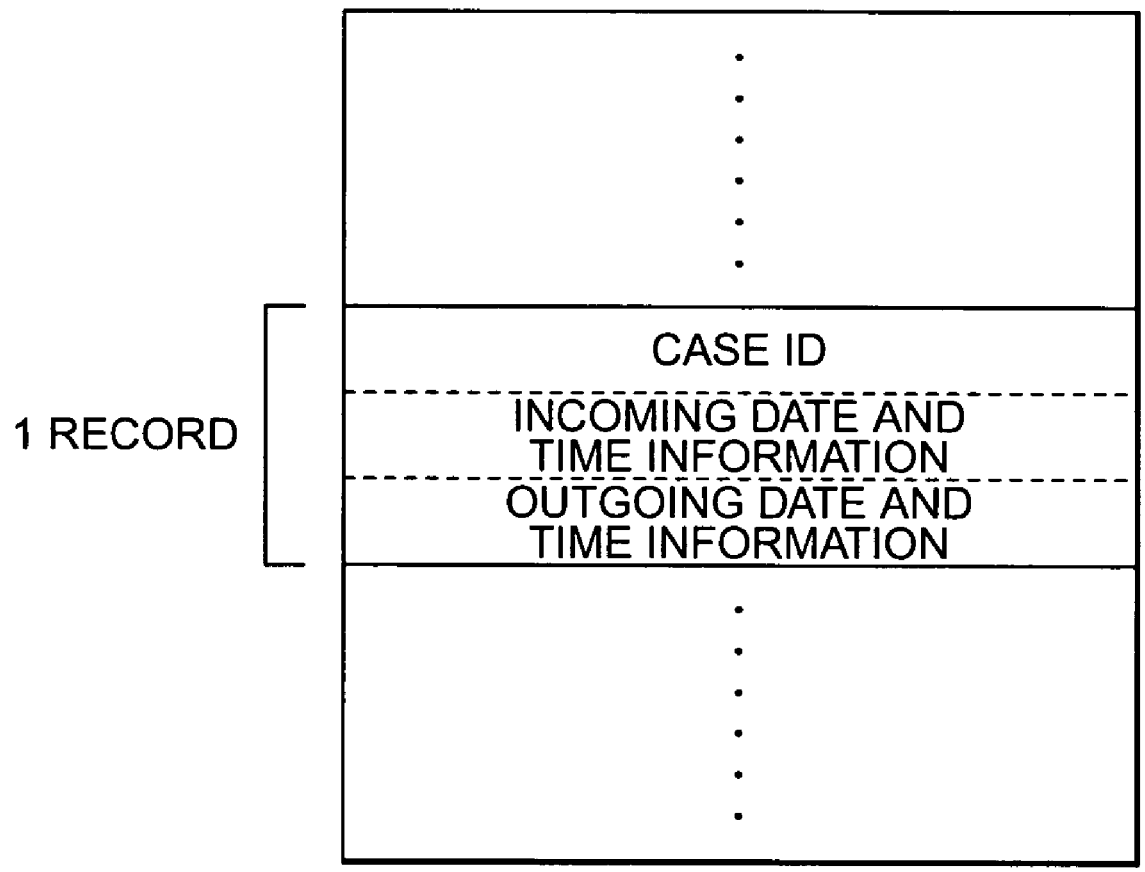
FIG. 8 shows the information stored in the distribution information storage unit of a distribution base.

The distribution information storage unit 405-i provided for the distribution base 40-i stores the enumerated data including: the case ID of the distribution case 30 stored in the distribution base 40-i; the incoming date and time of the distribution case 30; and the outgoing date and time of the distribution case 30 as shown in FIG. 8.

The distribution information storage unit 701-i provided for the distribution management center 70-i manages the information on which distribution base 40-i has stored which distribution case 30, and the information on which distribution base 40-i currently stores which distribution case 30.

Figure 9:
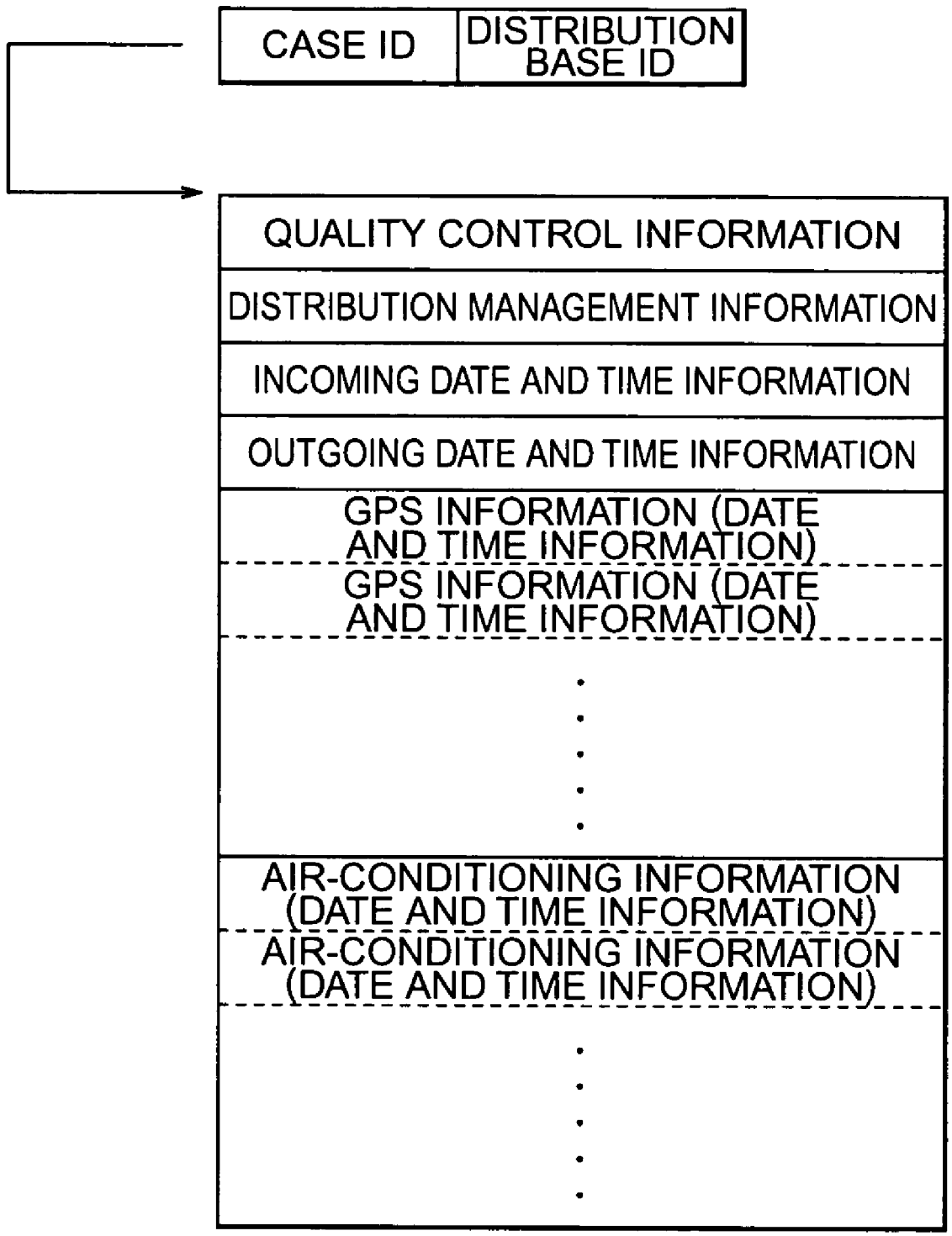
FIG. 9 shows the information stored in the distribution information storage unit of a distribution management center.

As shown in FIG. 9, the distribution information storage unit 701-i practically stores: the quality control information on vegetables, etc. stored in the distribution case 30 pointed to by the case ID using the pair data formed by the case ID and the distribution base ID as a key; the distribution control information on the distribution case 30; the incoming date and time information of the distribution case 30 stored in the distribution base 40-i; the outgoing date and time information of the distribution case 30 delivered from the distribution base 40-i; the time-series data of the position information on the distribution base 40-i during storage of the distribution case 30; and the time-series data of the air-conditioning information controlled by the distribution base 40-i during storage of the distribution case 30.

Figure 15:
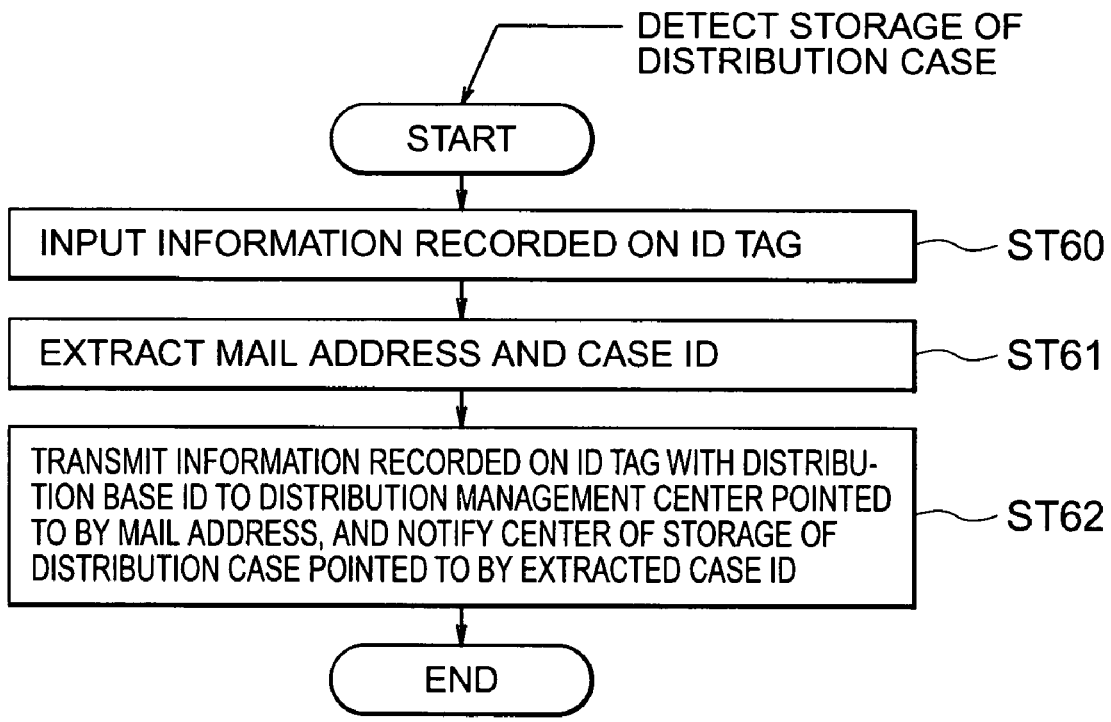
FIG. 15 shows an embodiment of a flow of the processing performed by the distribution notification unit of a distribution base.
Figure 16:
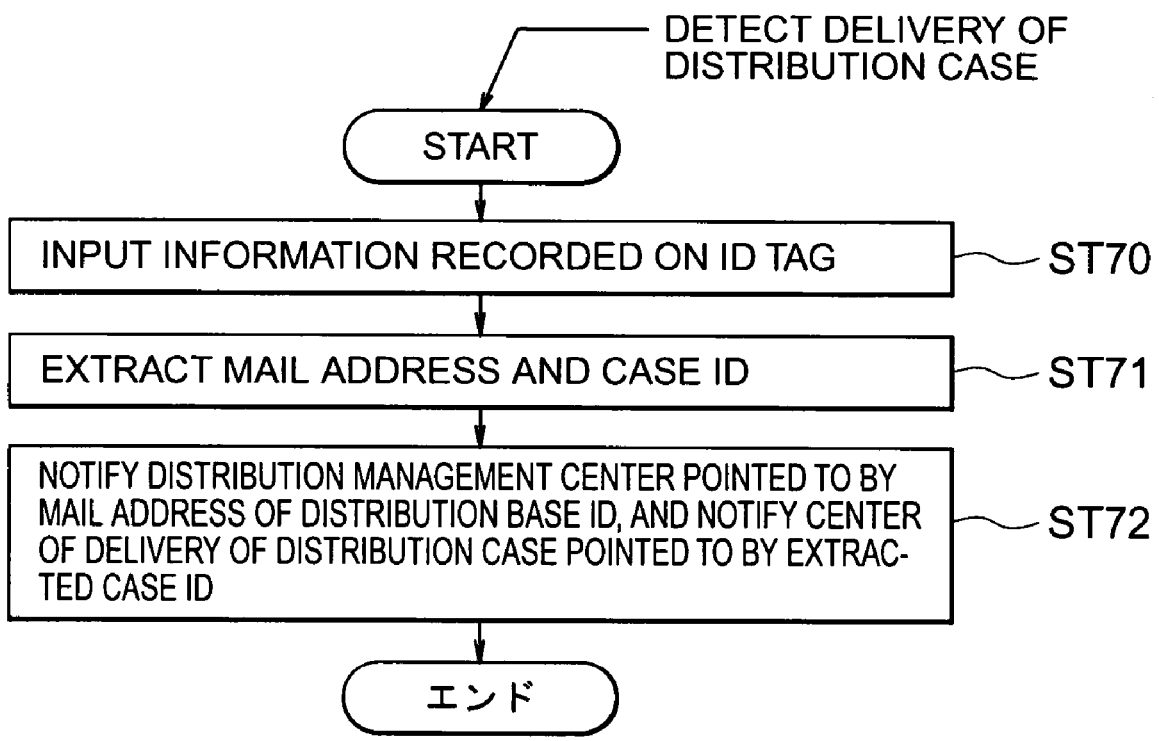
FIG. 16 shows an embodiment of a flow of the processing performed by the distribution notification unit of a distribution base.
Figure 18:
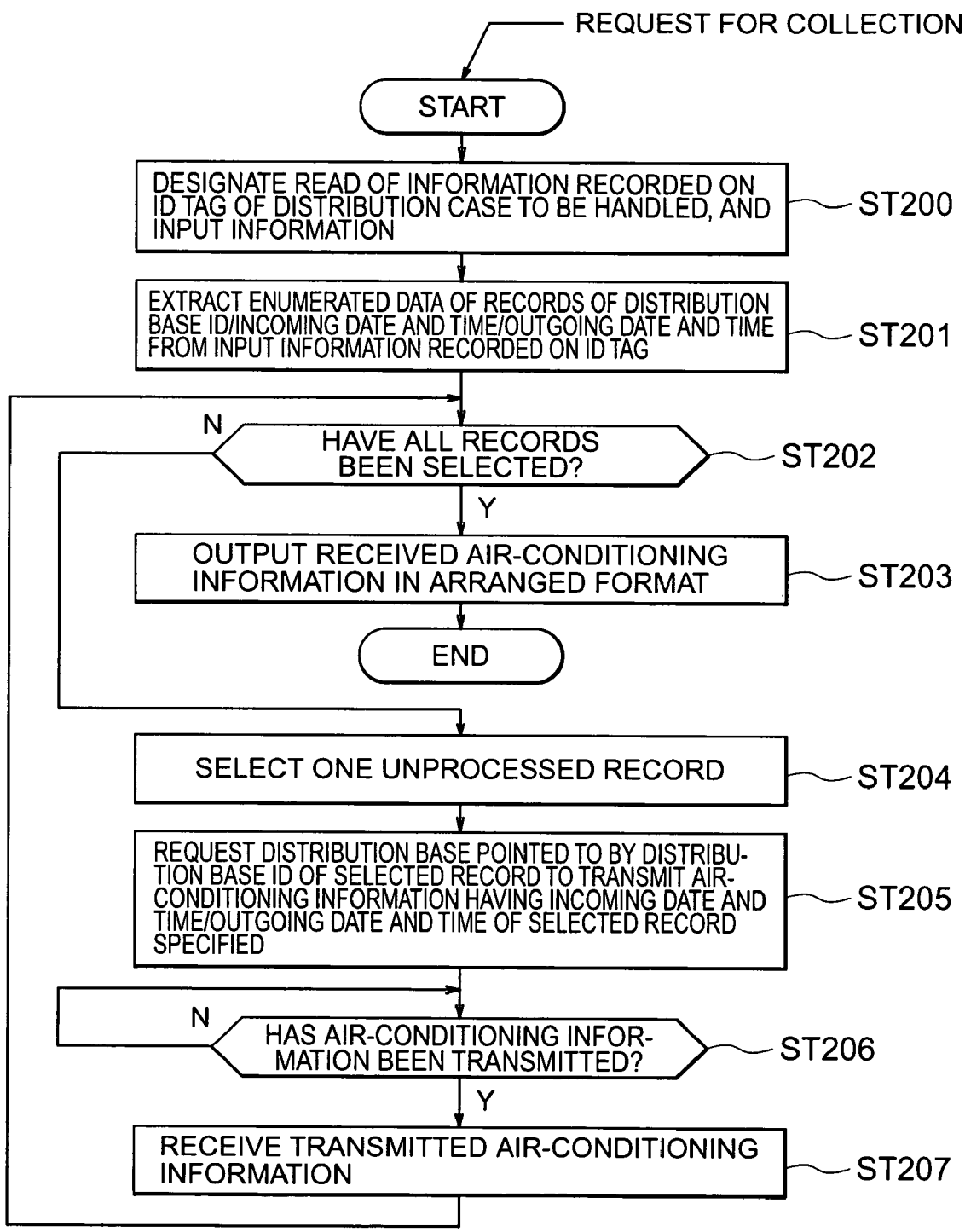
FIG. 18 shows an embodiment of a flow of the processing performed by the quality control unit of a quality control center.
Figure 19:
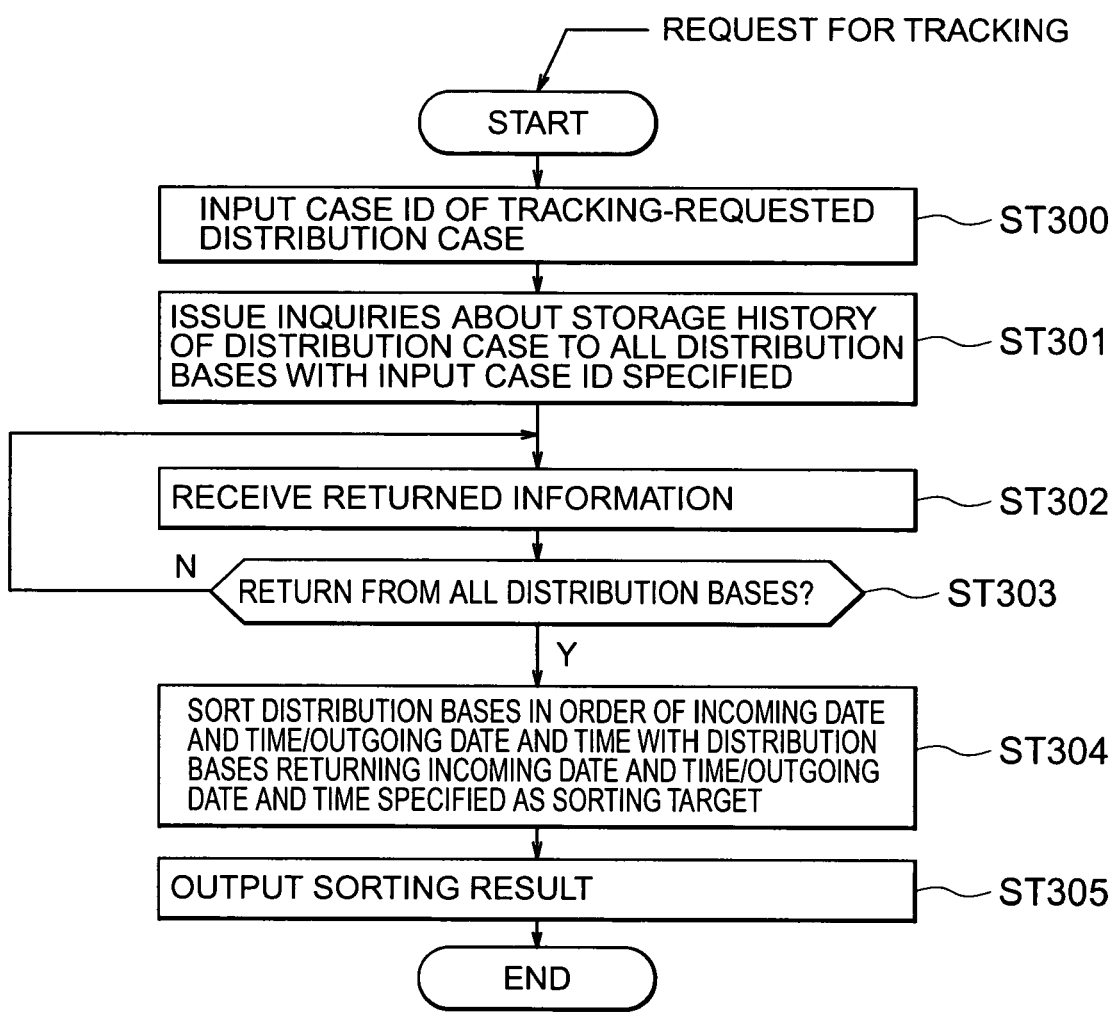
FIG. 19 shows an embodiment of a flow of the processing performed by the distribution tracking unit of a client terminal.
Figure 20:
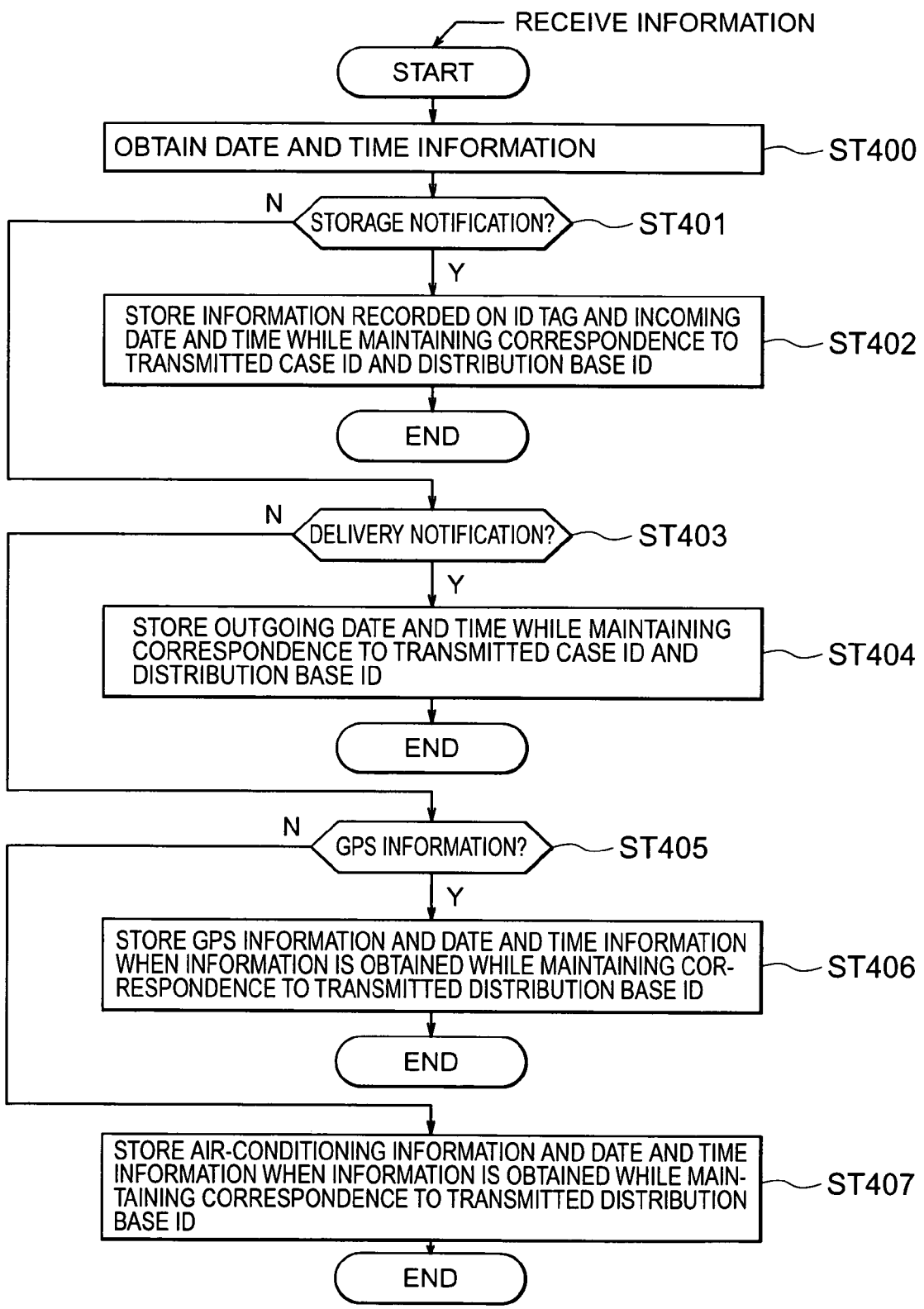
FIG. 20 shows an embodiment of a flow of the processing performed by the distribution tracking unit of a distribution management center.

FIGS. 10 to 14 show an embodiment of a flow of the processing performed by the distribution control unit 404-i provided for the distribution base 40-i. FIGS. 15 to 17 show an embodiment of a flow of the processing performed by the distribution notification unit 406-i provided for the distribution base 40-i. FIG. 18 shows an embodiment of a flow of the processing performed by the quality control unit 500-i provided for the quality management center 50-i. FIG. 19 shows an embodiment of a flow of the processing performed by the distribution tracking unit 600-i provided for the client terminal 60-i. FIG. 20 shows an embodiment of a flow of the processing performed by the distribution tracking unit 700-i provided for the distribution management center 70-i.

The processing of the embodiments with the above-mentioned structures is described below in detail by referring to each flow of the processing.

Figure 10:
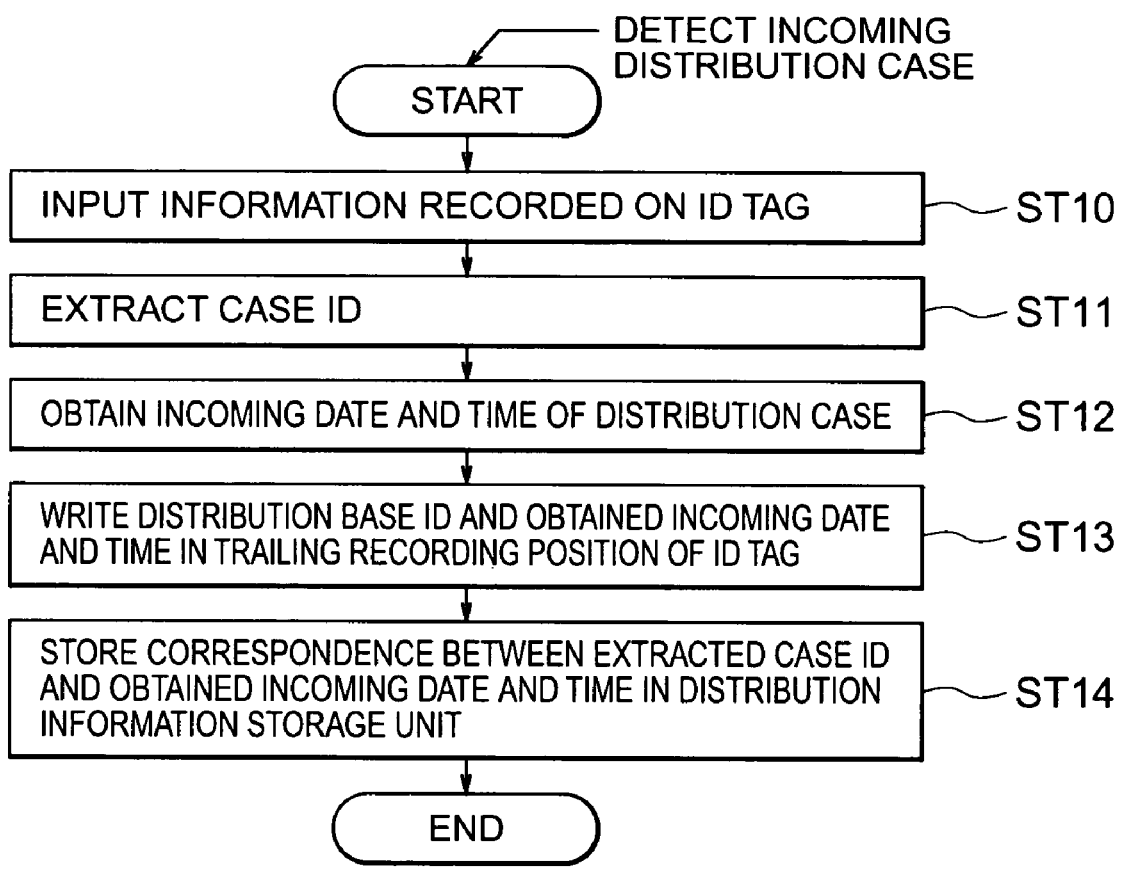
FIG. 10 shows an embodiment of a flow of the processing performed by the distribution management unit of a distribution base.
Figure 11:
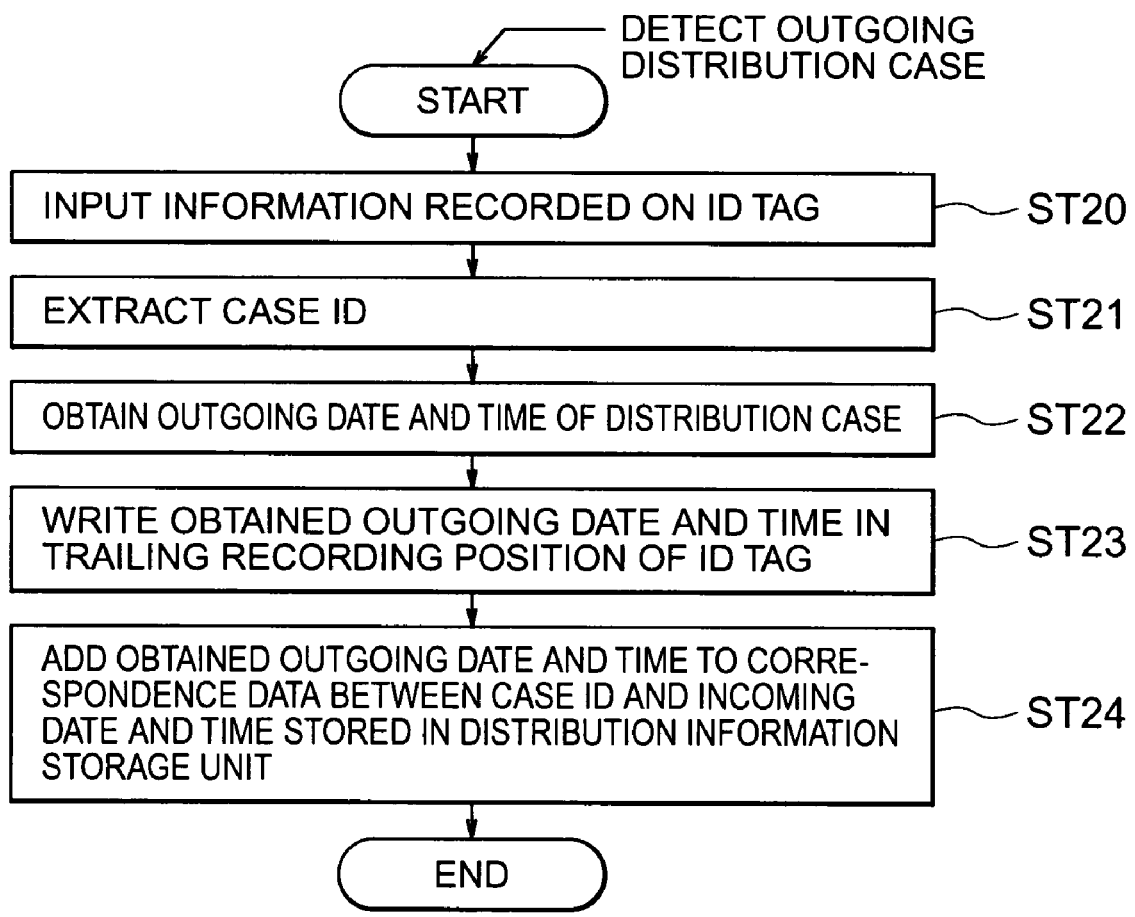
FIG. 11 shows an embodiment of a flow of the processing performed by the distribution management unit of a distribution base.

(A) Processing Performed by the Distribution Control Unit 404-i (A-1) Explanation of the Flow of the Processing Shown in FIGS. 10 and 11

When a distribution case 30 is stored in a distribution base 40-i, the ID controller 403-i reads the ID tag 300 attached to the distribution case 30, thereby detecting the storage of the distribution case 30. For example, an operator inputs storage information, and the ID controller 403-i reads the ID tag 300, thereby detecting the storage of the distribution case 30.

The distribution control unit 404-i provided for the distribution base 40-i detects the storage of the distribution case 30, and first inputs the information recorded on the ID tag 300 read by the ID controller 403-i in step 10 as shown in the flow of the processing shown in FIG. 10.

Then, in step 11, the case ID of the incoming distribution case 30 is extracted from the input information recorded on the ID tag 300. In step 12, the date and time information on the incoming date and time of the distribution case 30 is obtained.

Then, in step 13, the ID controller 403-i is instructed to write the ID of the distribution base 40-i and the obtained storage date and time in the trailing record position of the ID tag 300 attached to the incoming distribution case 30. At this time, the electronic mail address can be used as an ID of the distribution base 40-i.

Then, in step 14, the distribution information storage unit 405-i stores the correspondence between the extracted case ID and the obtained incoming date and time, thereby terminating the processing.

The ID tag 300 records the electronic mail address of the device set as a notification destination, but the processing using the electronic mail address is described later. When the quality control information and the distribution control information recorded on the ID tag 300 is sent to a program which utilizes the information, the processing of displaying the information can be realized.

When the stored distribution case 30 is delivered, the ID controller 403-i reads the ID tag 300 attached to the distribution case 30, thereby detecting the delivery of the distribution case 30. For example, when the operator inputs the delivery, and the ID controller 403-i reads the ID tag 300, the delivery of the distribution case 30 can be detected.

When the distribution control unit 404-i detects the delivery of the distribution case 30, it inputs the information recorded on the ID tag 300 read by the ID controller 403-i first in step 20 as shown in the flow of the processing shown in FIG. 11.

Then, in step 21, the case ID of the outgoing distribution case 30 is extracted from the input information recorded on the ID tag 300. In step 22, the date and time information which is the outgoing date and time of the outgoing distribution case 30 is obtained.

Then, in step 23, the ID controller 403-i is instructed to write the obtained outgoing date and time in the trailing record position of the ID tag 300 attached to the outgoing distribution case 30.

In step 24, using the correspondence data between the case ID and the incoming date and time stored in the distribution information storage unit 405-i as a retrieval target, the correspondence data having the extracted case ID is retrieved, and the obtained outgoing date and time is added to the retrieved correspondence data, thereby terminating the processing.

Figure 21:
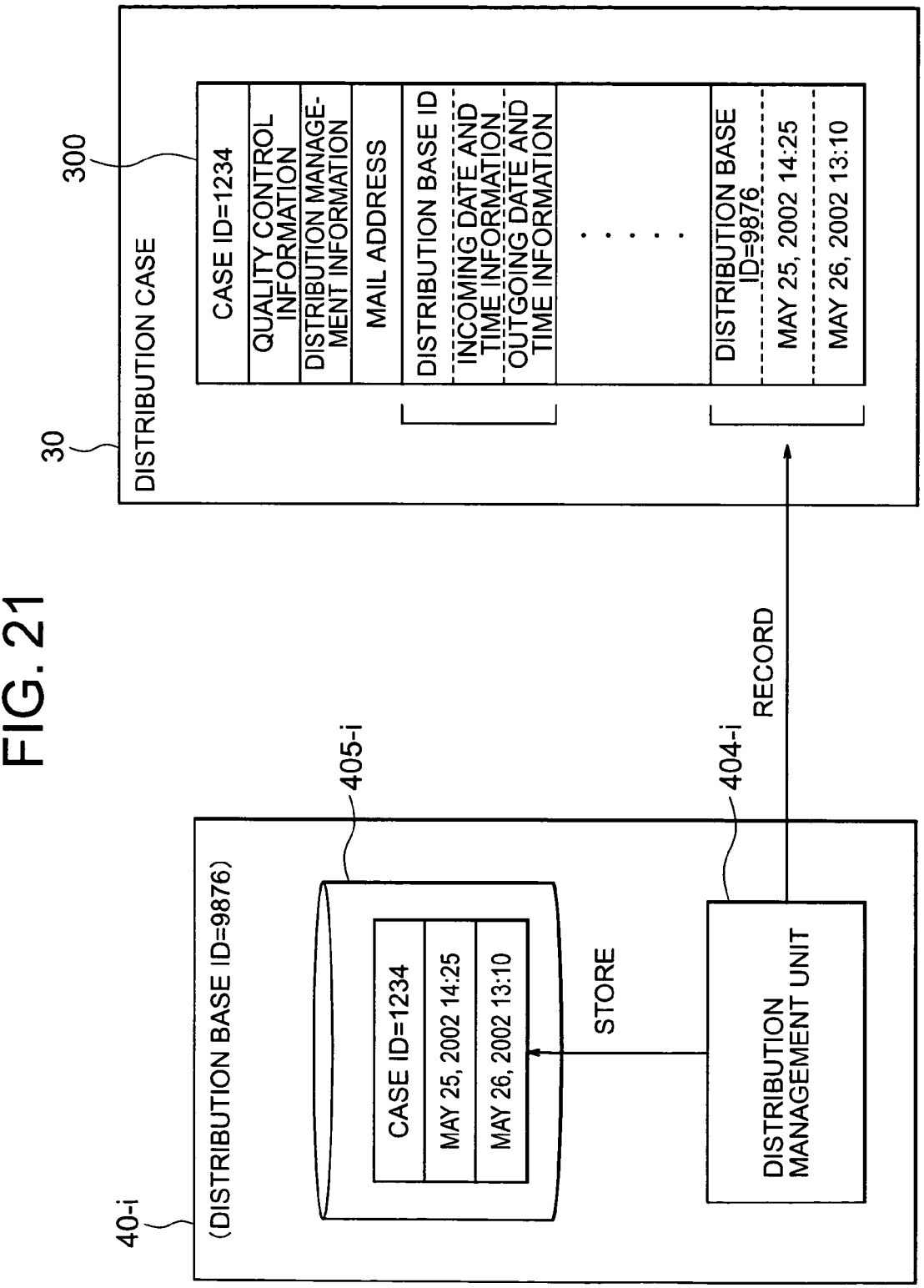
FIG. 21 shows the processing performed by the distribution management unit of a distribution base.

Thus, when the distribution control unit 404-i receives, stores, and delivers the distribution case 30, it records at the end of the ID tag 300 attached to the distribution case 30 as shown in FIG. 21 the information (or record) including the ID of the distribution base 40-i, the incoming date and time, and the outgoing date and time, and stores in the distribution information storage unit 405-i the information (or record) including the case ID of the distribution case 30, the incoming date and time, and the outgoing date and time.

Thus, as shown in FIG. 21, the enumerated data of the record including the ID of the distribution base 40-i which is a storage, the incoming date and time to the distribution base 40-i, and the outgoing date and time from the distribution base 40-i is recorded on the ID tag 300 attached to the distribution case 30 distributed from a distribution base 40-i to another distribution base 40-i.

Figure 12:
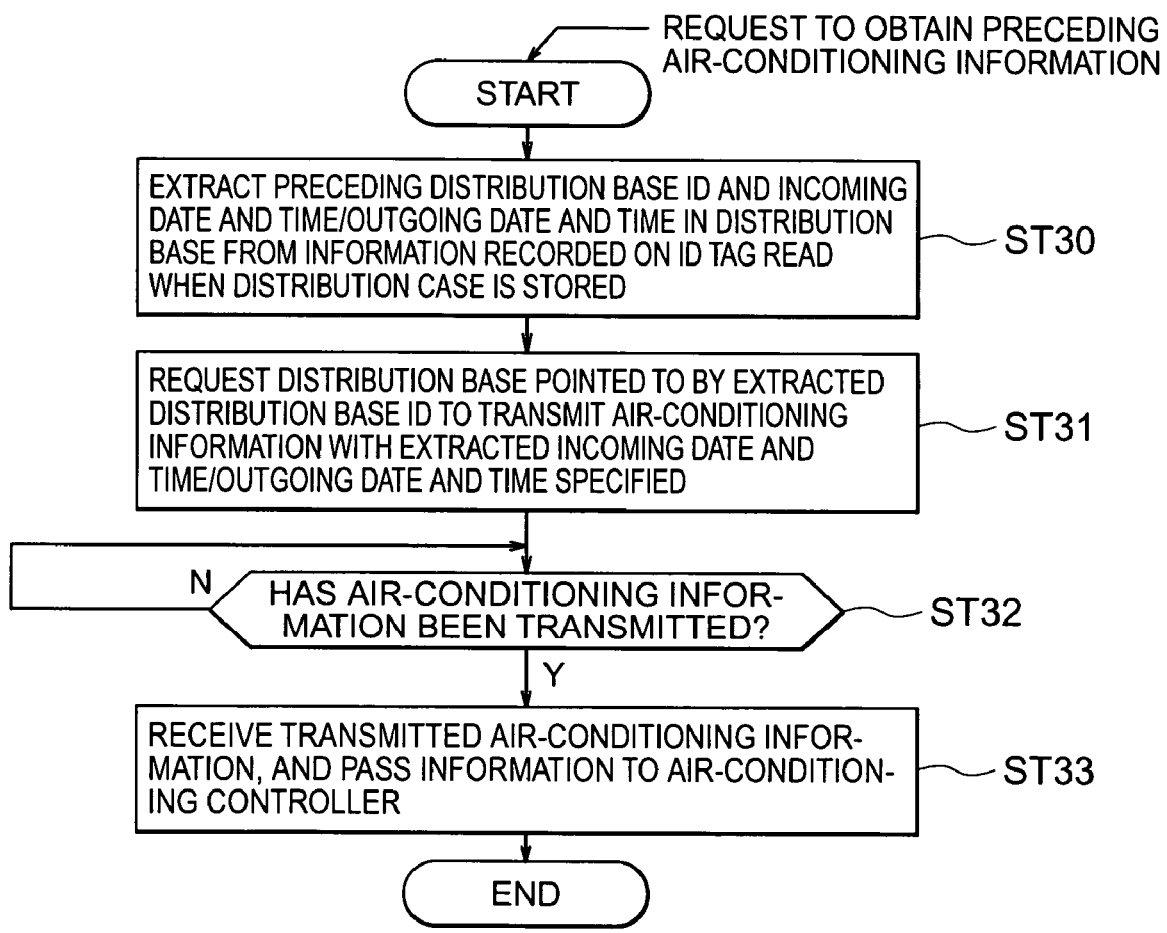
FIG. 12 shows an embodiment of a flow of the processing performed by the distribution management unit of a distribution base.

(A-2) Explanation of the Flow of the Processing Shown in FIG. 12

When a distribution case 30 is stored in a distribution base 40-i, the air-conditioning controller 401-i of the distribution base 40-i obtains the air-conditioning information on the time when it was stored in the preceding distribution base 40-i to determine the target temperature in the current distribution base 40-i according to the obtained air-conditioning information.

At the above-mentioned request, the distribution control unit 404-i receives a request to obtain the air-conditioning information on during storage in the preceding distribution base 40-i, in step 30, first extracts the ID of the preceding distribution base 40-i and the incoming date and time/outgoing date and time in the preceding distribution base 40-*i* from the information recorded on the ID tag 300 and read when the distribution case 30 is stored, as shown in the flow of the processing shown in FIG. 12.

Then, in step 31, the extracted incoming date and time/outgoing date and time is indicated to the preceding distribution base 40-*i* pointed to by the extracted distribution base ID, and the distribution base 40-*i* is requested to transmit the air-conditioning information in the period between the incoming date and time and the outgoing date and time.

In response to the transmission request, the distribution control unit 404-*i* provided for the preceding distribution base 40-*i* reads the air-conditioning information in the period between the incoming date and time and the outgoing date and time from the air-conditioning information storage unit 402-*i* of the base according to the flow of the processing shown in FIG. 13 (described later), and returns the information.

In step 32, when the air-conditioning information is transmitted from the preceding distribution base 40-*i*, and the received air-conditioning information detected, control is passed to step 33, the transmitted air-conditioning information is received and passed to the air-conditioning controller 401-*i*, thereby terminating the processing.

After the processing of the distribution control unit 404-*i*, the air-conditioning controller 401-*i* obtains the air-conditioning information on the distribution case 30 when it was stored in the preceding distribution base 40-*i*, and it possibly controls the air-conditioning in the distribution base 40-*i* according to the information.

In this example, the explanation is given using a practical example of obtaining the air-conditioning information during the storage in the preceding distribution base 40-*i*. However, the similar processing can be performed when the air-conditioning information in all storing distribution bases 40-*i* is obtained.

Figure 13:
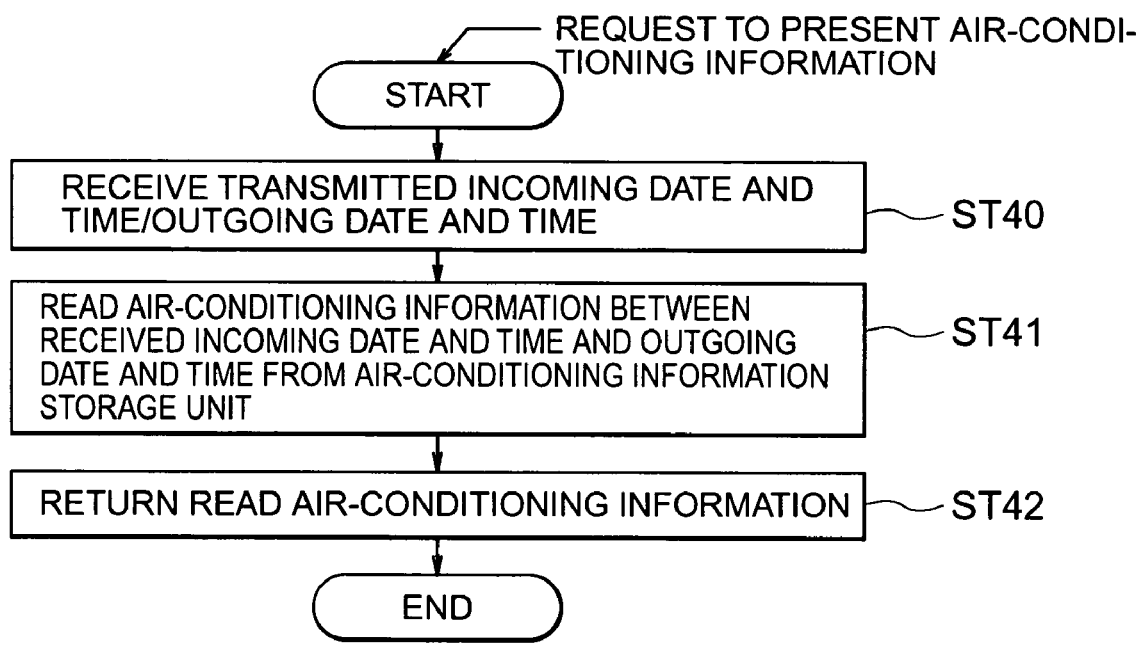
FIG. 13 shows an embodiment of a flow of the processing performed by the distribution management unit of a distribution base.

(A-3) Explanation of the Flow of the Processing Shown in FIG. 13

According to the processing in step 31 in the flow of the processing shown in FIG. 12, the distribution control unit 404-*i* receives a presentation request for air-conditioning information from another distribution base 40-*i*, and first receives the information on the incoming date and time/outgoing date and time transmitted from the preceding distribution base 40-*i* which has issued the presentation request in step 40 as shown in the flow of the processing shown in FIG. 13.

Then, in step 41, the air-conditioning information in the period between the received incoming date and time and outgoing date and time is read from the air-conditioning information storage unit 402-*i*. That is, since the air-conditioning information storage unit 402-*i* stores the history of the air-conditioning information in the distribution base 40-*i* as shown in FIG. 7, the air-conditioning information in the period between the received incoming date and time and outgoing date and time can be read from the stored air-conditioning information.

In step 42, the read air-conditioning information is returned to the distribution base 40-*i* which has issued the presentation request, thereby terminating the processing.

According to the flow of the processing shown in FIG. 13, the air-conditioning controller 401-*i* of each distribution base 40-*i* obtains the air-conditioning information during the storage in the preceding distribution base 40-*i*, etc. as explained by referring to the flow of the processing shown in FIG. 12, thereby controlling the air-conditioning in the distribution base 40-*i*.

Figure 14:
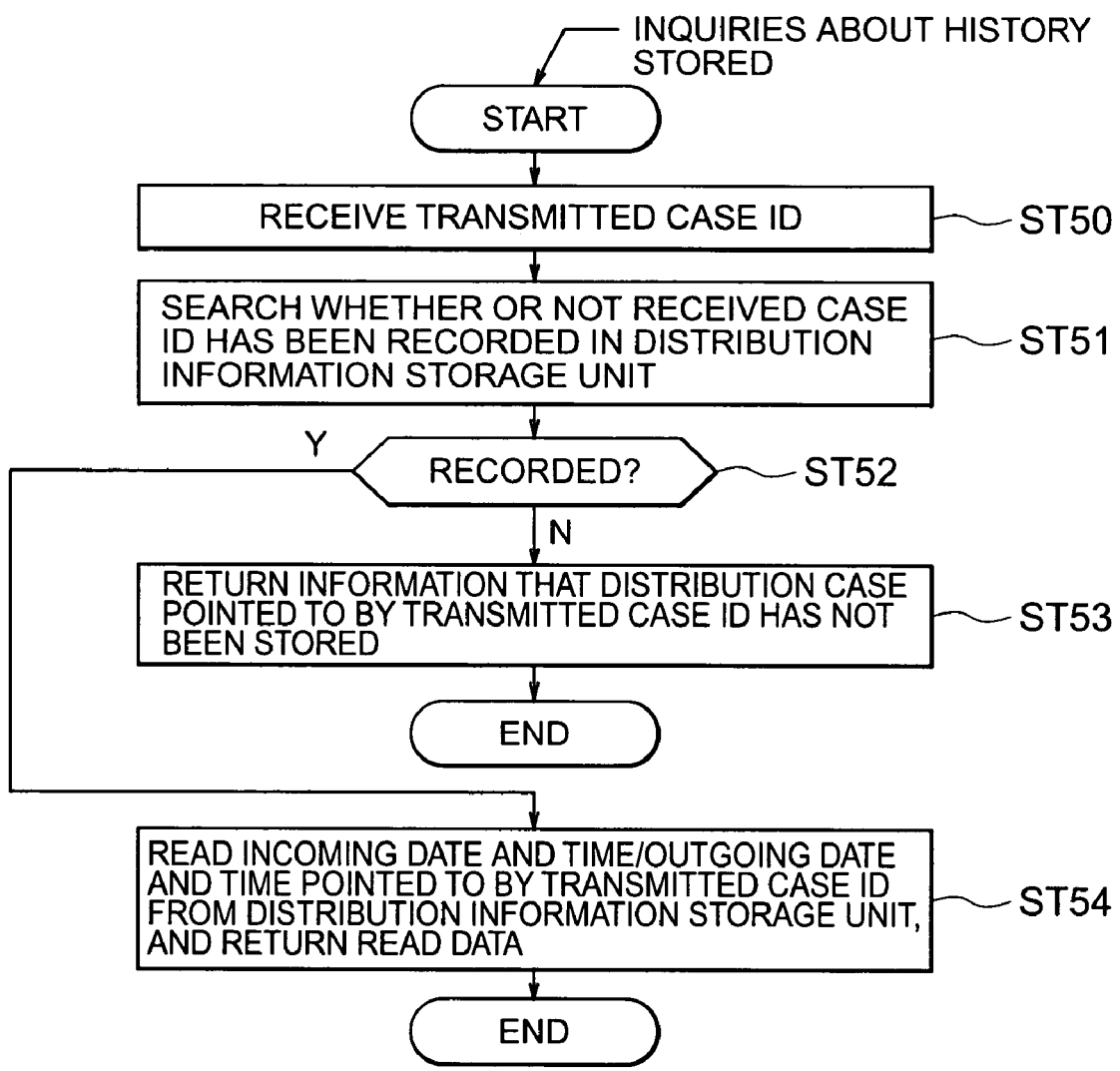
FIG. 14 shows an embodiment of a flow of the processing performed by the distribution management unit of a distribution base.

(A-4) Explanation of the Flow of the Processing Shown in FIG. 14

As described later, the distribution tracking unit 600-*i* provided for the client terminal 60-*i* makes inquiries to each distribution base 40-*i* about the storage history of a distribution case 30 with the case ID of the distribution case 30 specified.

Then, the distribution control unit 404-*i* of each distribution base 40-*i* receives the inquiries about the storage history from the client terminal 60-*i*, and first receives the case ID of the distribution case 30 transmitted from the client terminal 60-*i* which has issued the inquiries in step 50 as shown in the flow of the processing shown in FIG. 14.

Then, in step 51, it is checked whether or not the received case ID has been recorded in the distribution information storage unit 405-*i* having the data structure as shown in FIG. 8. That is, it is checked whether or not the distribution case 30 pointed to by the received case ID has been stored therein.

Then, in step 52, it is determined whether or not the check result that the received case ID has been recorded in the distribution information storage unit 405-*i* has been obtained. If not, control is passed to step 53, and a reply that the distribution case 30 pointed to by the transmitted case ID has not been stored is returned to the inquiring client terminal 60-*i*, thereby terminating the processing.

On the other hand, if it is determined as a check result that the received case ID has been recorded in the distribution information storage unit 405-*i*, then control is passed to step 54, the incoming date and time/outgoing date and time corresponding to the transmitted case ID is read from the distribution information storage unit 405-*i*, and the read data is returned to the inquiring client terminal 60-*i*, thereby terminating the processing.

As described later, in response to the reply, the distribution tracking unit 600-*i* provided for the client terminal 60-*i* can track the distribution status of the distribution case 30.

(B) Processing of Distribution Notification Unit 406-*i*

(B-1) Explanation of the Flows of the Processing Shown in FIGS. 15 and 16

If a distribution case 30 is stored in a distribution base 40-*i*, the ID controller 403-*i* reads the ID tag 300 attached to the distribution case 30, thereby detecting the storage of the distribution case 30. For example, when the operator inputs the storage information, and the ID controller 403-*i* reads the ID tag 300, the storage of the distribution case 30 is detected.

The distribution notification unit 406-*i* provided for the distribution base 40-*i* receives the detection information on the storage of the distribution case 30, and first inputs the information recorded on the ID tag 300 read by the ID controller 403-*i* in step 60 as shown in the flow of the processing shown in FIG. 15.

Then, in step 61, it extracts the case ID of the incoming distribution case 30 and the electronic mail address of the notification destination from the input information recorded on the ID tag 300. In the case of the embodiment, the electronic mail address of a distribution management center 70-*i* is extracted.

Then, in step 62, the ID of the distribution base 40-*i* is added to the input information recorded on the ID tag 300, the information recorded on the ID tag 300 with the ID of the distribution base 40-*i* is returned to the distribution management center 70-*i* pointed to by the extracted electronic mail address, and a notification that the distribution case 30 pointed to by the extracted case ID has been stored in the distribution base 40-*i* is made, thereby terminating the processing.

When the stored distribution case 30 is delivered, the ID controller 403-*i* reads the ID tag 300 attached to the distribution case 30, and the delivery of the distribution case 30 is detected. For example, the operator inputs the delivery information, and the ID controller 403-*i* reads the ID tag 300, thereby detecting the delivery of the distribution case 30.

The distribution notification unit 406-*i* receives the detection information on the delivery of the distribution case 30, and first inputs the information recorded on the ID tag 300 read by the ID controller 403-*i* in step 70 as shown in the flow of the processing shown in FIG. 16.

Then, in step 71, the case ID of the outgoing distribution case 30 and the electronic mail address of the notification destination are extracted from the input information recorded on the ID tag 300. In the case of the embodiment, the electronic mail address of a distribution management center 70-*i* is extracted.

In step 72, the distribution management center 70 pointed to by the extracted mail address is notified of the ID of the distribution base 40-*i*, and of the distribution case 30 which is pointed to by the extracted case ID and delivered from the distribution base 40-*i*, thereby terminating the processing. Since the information recorded on the ID tag 300 has already been transmitted when the case is stored, it is not necessary to transmit the information again.

As described later, in response to the notification transmitted according to the flows of the processing shown in FIGS. 15 and 16, the distribution tracking unit 700-*i* provided for the distribution management center 70-*i* can track in real time the distribution status of each distribution case 30.

Figure 17A:
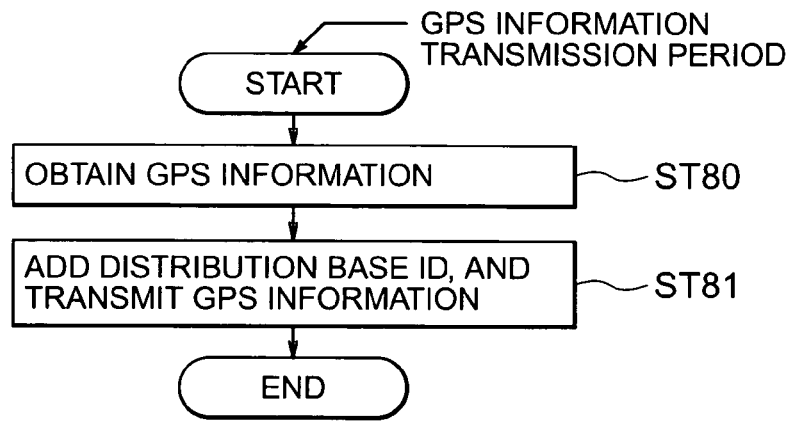
FIGS. 17A, 17B and 17C show an embodiment of flows of the processing performed by the distribution notification unit of a distribution base.
Figure 17B:
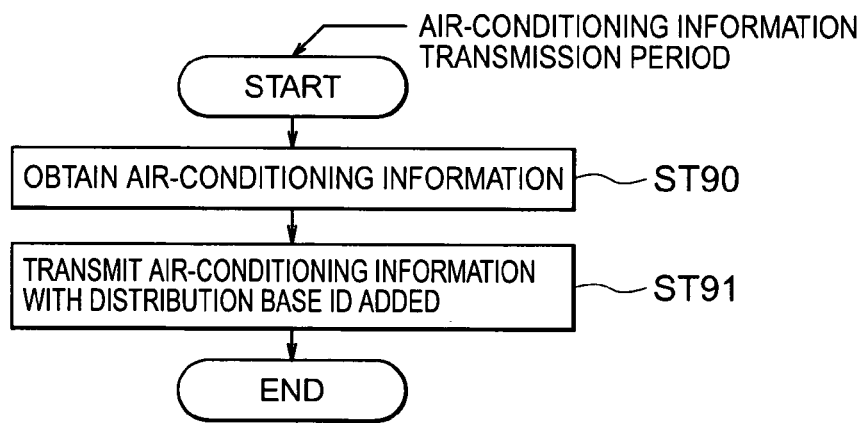
Figure 17C:
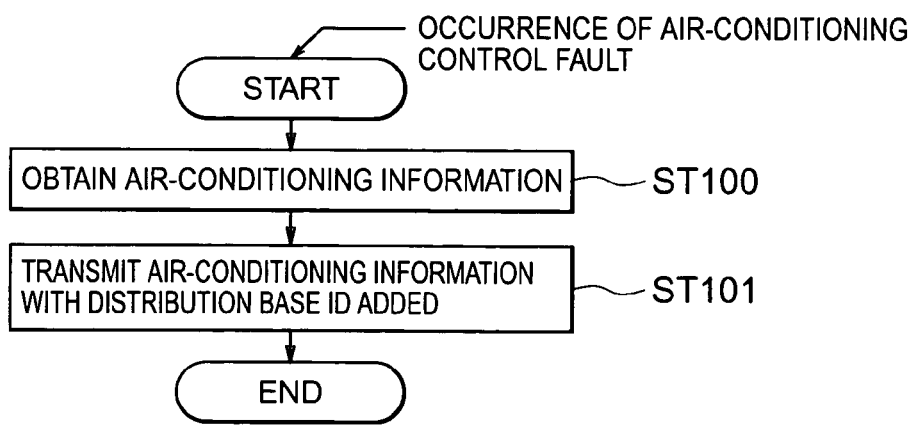

(B-2) Explanation of the Flow of the Processing Shown in FIGS. 17A, 17B and 17C

At a transmission interval of the GPS information which is defined at a predetermined interval, the distribution notification unit 406-*i* provided for the distribution base 40-*i* first obtains the GPS information at that point from the GPS processing unit 407-*i* in step 80 as shown in the flow of the processing shown in FIG. 17A. In step 81, the distribution notification unit 406-*i* adds the ID of the distribution base 40-*i* and transmits the obtained GPS information to the distribution management center 70 pointed to by the electronic mail address read from the ID tag 300 attached to the stored distribution case 30, thereby terminating the processing.

At a transmission interval of the air-conditioning information which is defined at a predetermined interval, the distribution notification unit 406-*i* first obtains the air-conditioning information at that point from the air-conditioning controller 401-*i* in step 90 as shown in the flow of the processing shown in FIG. 17B. In step 91, the distribution notification unit 406-*i* adds the ID of the distribution base 40-*i* and transmits the obtained air-conditioning information to the distribution management center 70 pointed to by the electronic mail address read from the ID tag 300 attached to the stored distribution case 30, thereby terminating the processing.

When a fault occurs during the air-conditioning control, the distribution notification unit 406-*i* first obtains the air-conditioning information at the time point from the air-conditioning controller 401-*i* in step 100 as shown in the flow of the processing shown in FIG. 17C. Then, in step 101, the distribution notification unit 406-*i* adds the ID of the distribution base 40-*i* and transmits the obtained air-conditioning information to the distribution management center 70-*i* pointed to by the electronic mail address read from the ID tag 300 attached to the stored distribution case 30, thereby terminating the processing.

As described later, in response to the notification transmitted according to the flow of the processing shown in FIGS. 17A, 17B and 17C, the distribution tracking unit 700-*i* provided for the distribution management center 70-*i* can track in real time the distribution status of each distribution case 30.

(C) Processing of Quality Control Unit 500-*i*

The quality control unit 500-*i* provided for the quality management center 50-*i* collects air-conditioning information storing the distribution case 30 as a processing target specified by a quality controller, etc., thereby presenting the quality controller, etc. with the necessary information for the quality control of the distribution case 30.

That is, when the distribution case 30 stored in the distribution base 40-*i* which is the final storage is specified, and a collection request for air-conditioning information storing the distribution case 30 is issued, the quality control unit 500-*i* first issues a read instruction to the ID controller 501-*i* in step 200 as shown in the flow of the processing shown in FIG. 18, thereby reading the information recorded on the ID tag 300 attached to the distribution case 30 to be handled, and inputting the information.

Then, in step 201, the enumerated data of a record including the distribution base ID, the incoming date and time, and the outgoing date and time is extracted from the input information recorded on the ID tag 300. That is, since the enumerated data of the record including the distribution base ID, the incoming date and time, and the outgoing date and time is recorded on the ID tag 300 as shown in FIG. 21, the records are all extracted.

Then, in step 202, it is determined whether or not all the extracted records have been selected. If it is determined that all the records are not selected, then control is passed to step 204, and an unprocessed record is selected from among the selected records.

Then, in step 205, the distribution base 40-*i* pointed to by the distribution base ID of the selected record is requested to transmit air-conditioning information with the incoming date and time/outgoing date and time of the selected record specified.

When a destination such as an electronic mail address, etc. is used as a distribution base ID, a transmission request for the air-conditioning information can be immediately issued using the destination. However, when such a destination as an electronic mail address, etc. is not used, the destination of the distribution base 40-*i* which is the destination of the air-conditioning information is obtained by searching the address book for management of the correspondence between a distribution base ID and a destination, thereby issuing the transmission request for the air-conditioning information.

The distribution control unit 404-*i* of the distribution base 40-*i* which has received the transmission request for air-conditioning information reads the air-conditioning information between the specified incoming date and time and outgoing date and time according to the flow of the processing shown in FIG. 13, and returns it.

In step 206, the air-conditioning information is awaited. If the air-conditioning information is detected, then control is passed to step 207, and the transmitted air-conditioning information is received and then control is returned to step 202 to handle the next record.

If it is determined in step 202 that all the extracted record have been selected, then control is passed to step 203, and the air-conditioning information received in step 207 is appropriately arranged and output, thereby terminating the processing.

Figure 22:
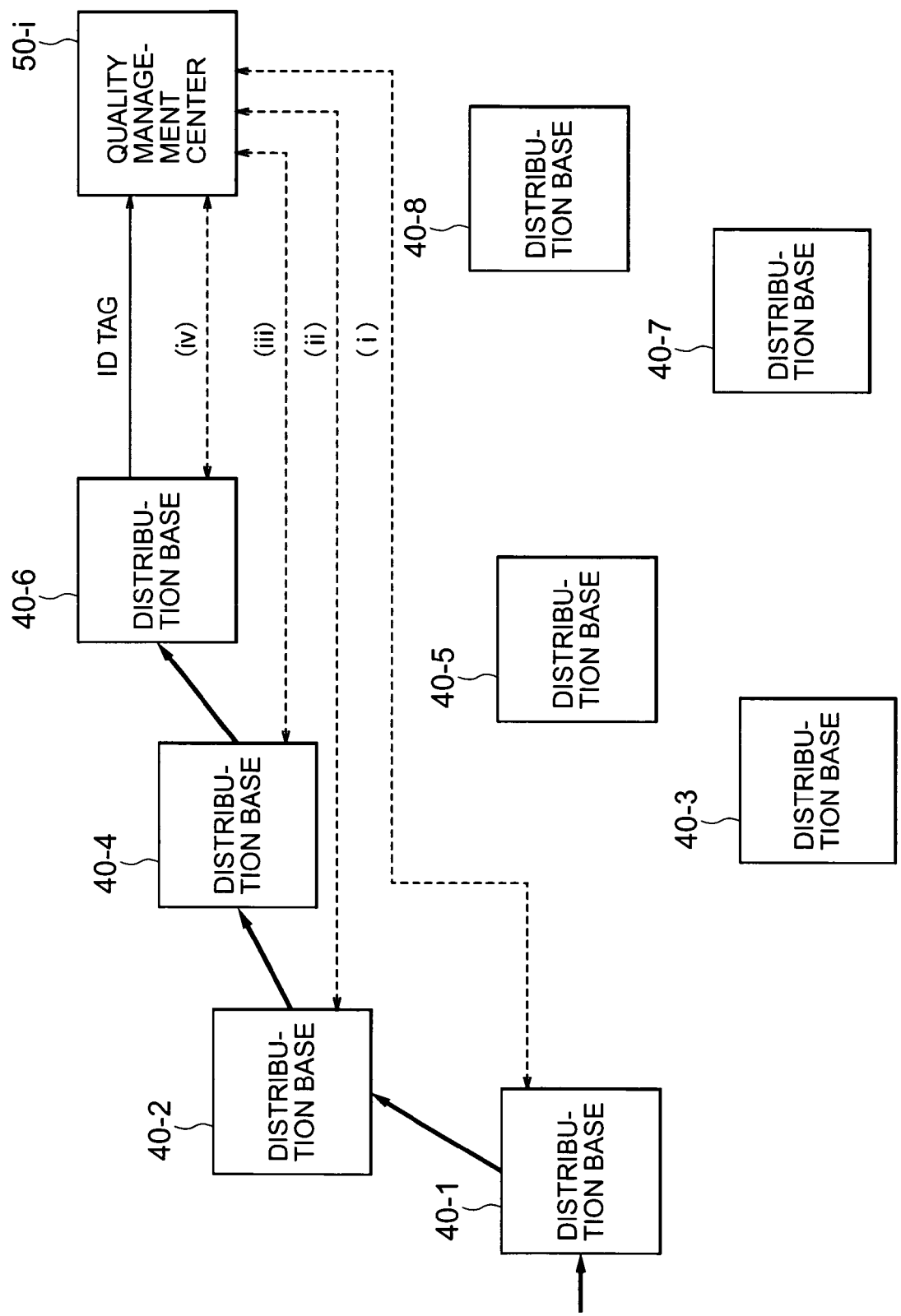
FIG. 22 shows the processing performed by the quality control unit of a quality control center.

Thus, the quality control unit 500-*i* collects the air-conditioning information during storage of the distribution case 30 from the distribution base 40-*i* which has stored the distribution case 30 according to the information recorded on the ID tag 300 attached to the distribution case 30 to be handled as shown in FIG. 22, thereby presenting the quality controller, etc. with the necessary information in the quality control of the distribution case 30.

That is, in the explanation of the example shown in FIG. 22, according to the information recorded on the ID tag 300 attached to the distribution case 30 to be handled, the quality control unit 500-$i$ can be informed that the case is stored in: (i) the distribution base 40-1 from May 20 at 14:00 to May 23 at 10:45; (ii) the distribution base 40-2 from May 23 at 11:00 to May 25 at 14:15; (iii) the distribution base 40-4 from May 25 at 14:25 to May 26 at 13:10; and (iv) the distribution base 40-6 from May 26 at 13:20. Therefore, by collecting the air-conditioning information during storage of the distribution case 30 from the distribution bases 40-1, 40-2, 40-4, and 40-6, a quality controller, etc. can be presented with the necessary information in the quality control of the distribution case 30.

(D) Processing of Distribution Tracking Unit 600-$i$

The distribution tracking unit 600-$i$ provided for the client terminal 60-$i$ detects the current distribution base 40-$i$ of a target distribution case 30, which is specified by a distribution manager, etc., or the distribution bases 40-$i$ through which the target distribution case 30 has passed, thereby presenting the information on the distribution status of the target distribution case 30.

That is, if the case ID of the distribution case 30 is specified by a distribution manager, etc. and a request to track the distribution status of the distribution case 30 is issued, then the distribution tracking unit 600-$i$ first inputs the case ID of the track-requested distribution case 30 in step 300 as shown in the flow of the processing shown in FIG. 19.

Then, in step 301, inquiries are issued with the input case ID specified to all distribution bases 40-$i$ through the network 80 about the storage history of the distribution case 30 pointed to by the case ID.

Upon receipt of the request inquiry for the storage history, the distribution control unit 404-$i$ provided for each distribution base 40-$i$ returns a negative answer if the distribution case 30 pointed to by the specified case ID has not been stored, and returns the incoming date and time/outgoing date and time indicating the storage period if the case has been stored as shown in the flow of the processing shown in FIG. 14.

Then, in step 302, the information returned from each distribution base 40-$i$ in response to the inquiry about the storage history is received. Then, in 303, the returned information is continuously received until it is checked that the replies have been received from all distribution bases 40-$i$ to which the inquiries have been issued.

Then, in step 304, the distribution bases 40-$i$ which have returned the incoming date and time/outgoing date and time information are sorted in the order of incoming date and time/outgoing date and time. In step 305, the sort result is output.

Figure 23:
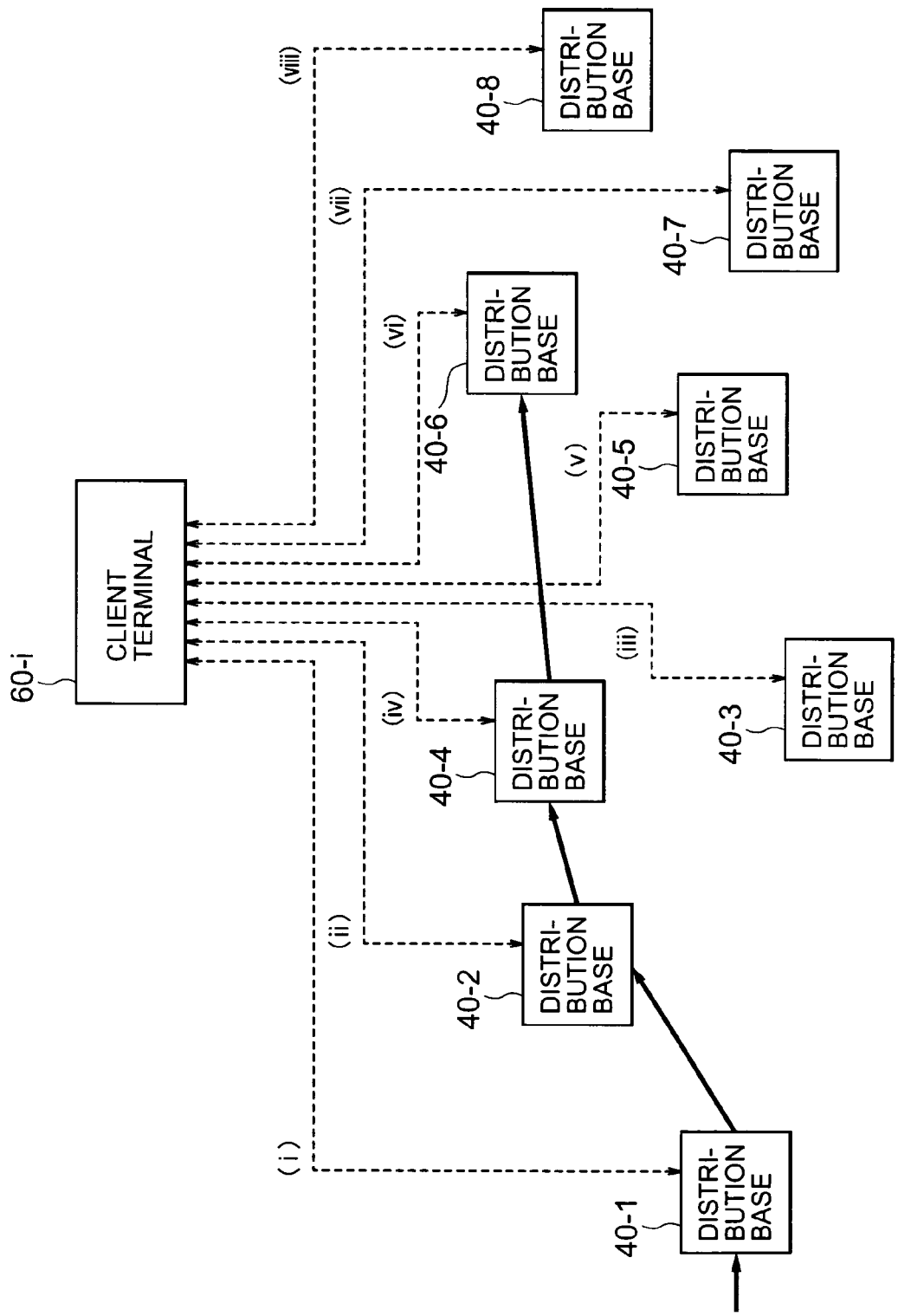
FIG. 23 shows the processing performed by the distribution tracking unit of a client terminal.

According to the output of the sort result, the distribution manager, etc. who has issued a track request for distribution status information can obtain the information on the current distribution base 40-$i$ storing the track-requested distribution case 30, etc. as shown in FIG. 23, and can also obtain the information on the distribution bases 40-$i$ through which the track-requested distribution case 30 has passed. The information on the current distribution base 40-$i$ storing the distribution case 30 can be obtained by designating the distribution base 40-$i$ for which the incoming date and time is stored and no outgoing date and time is stored.

That is, in the explanation of the example shown in FIG. 23, (i) the distribution base 40-1 returns the information on the storage from May 20 at 14:00 to May 23 at 10:45, (ii) the distribution base 40-2 returns the information on the storage from May 23 at 11:00 to May 25 at 14:15, (iii) the distribution base 40-3 returns the information showing no fact of storage, (iv) the distribution base 40-4 returns the information on the storage from May 25 at 14:25 to May 26 at 13:10, (v) the distribution base 40-5 returns no storage information, (vi) the distribution base 40-6 returns the information on the storage from May 26 at 13:20, (vii) the distribution base 40-7 returns the information showing no fact of storage, and (viii) the distribution base 40-8 returns the information showing no fact of storage. Then, the distribution manager, etc. who has issued the request for track of the distribution can obtain the information that the distribution base 40-1 first stored the case, and subsequently the distribution bases 40-2, and 40-4, and 40-6 is currently storing the case.

In the flow of the processing shown in FIG. 19, the distribution tracking unit 600-$i$ is not instructed by the distribution base 40-$i$ which has returned the incoming date and time/ outgoing date and time to collect the air-conditioning information during the storage of the distribution case 30. However, it is obvious that the distribution tracking unit 600-$i$ can collect the air-conditioning information.

(E) Processing of Distribution Tracking Unit 700-$i$

The distribution tracking unit 600-$i$ provided for the client terminal 60-$i$ issues inquiries to all distribution bases 40-$i$ so that the distribution bases 40-$i$ through which the track-requested distribution case 30 has passed can be detected. However, in this processing, the tracking process cannot be performed in real time.

On the other hand, the distribution tracking unit 700-$i$ provided for the distribution management center 70-$i$ receives and monitors the information transmitted from the distribution notification unit 406-$i$ provided for the distribution base 40-$i$ so that the distribution bases 40-$i$ through which each distribution case 30 has passed can be monitored in real time.

That is, as explained above by referring to the flow of the processing shown in FIGS. 15 to 17, the distribution notification unit 406-$i$ provided for the distribution base 40-$i$ transmits an incoming notification when the distribution case 30 is stored in the distribution base 40-$i$, and an outgoing notification when the distribution case 30 is delivered from the distribution base 40-$i$, according to the electronic mail address recorded on the ID tag 300. Additionally, the distribution notification unit 406-$i$ transmits, for example, GPS information or air-conditioning information periodically during the storage of the distribution case 30 in the distribution base 40-$i$.

Thus, the distribution tracking unit 700-$i$ monitors the information to monitor in real time the distribution bases 40-$i$ through which the distribution case 30 has passed.

When the monitoring process is realized, the distribution tracking unit 700-$i$ first obtains the date and time information on the reception time point in step 400 as shown in the flow of the processing shown in FIG. 20 when the above-mentioned information is transmitted from the distribution notification unit 406-$i$ provided for the distribution base 40-$i$.

If the date and time information on the time point of the occurrence of the information is transmitted together with the above-mentioned information from the distribution notification unit 406-$i$, then it is not necessary to perform the processing in step 400.

Then, in step 401, it is determined whether or not the received information is an incoming notification. If it is an incoming notification, control is passed to step 402, the correspondence between the case ID of the transmitted distribution case 30 and the ID of the distribution base 40-$i$ is maintained, and the information recorded on the ID tag 300 and the date and time information (indicating the incoming date and time) obtained in step 400 are stored in the distribution information storage unit 701-*i*, thereby terminating the processing.

On the other hand, if it is determined in step 401 that the received information is not an incoming notification, control is passed to step 403, and it is determined whether or not the received information is an outgoing notification. If it is an outgoing notification, control is passed to step 404, the correspondence between the case ID of the transmitted distribution case 30 and the ID of the distribution base 40-*i* is maintained, and the date and time information (indicating the outgoing date and time) obtained in step 400 is stored in the distribution information storage unit 701-*i*, thereby terminating the processing.

On the other hand, if it is determined in step 403 that the received information is not an outgoing notification, control is passed to step 405, and it is determined whether or not the received information is GPS information. If it is GPS information, control is passed to step 406, the correspondence to the ID of the distribution base 40-*i* is maintained, and the transmitted GPS information and the date and time information (indicating the obtaining date and time of the GPS information) obtained in step 400 is stored in the distribution information storage unit 701-*i*, thereby terminating the processing.

The GPS information is specific to the distribution base 40-*i*, but is not the information specific to each distribution case 30. Therefore, no information on the case ID of the distribution case 30 is transmitted. Thus, the distribution tracking unit 700-*i* stores the received GPS information at the entry of the distribution information storage unit 701-*i* having the ID of the transmitted distribution base 40-*i*.

On the other hand, if it is determined in step 405 that the received information is not the GPS information, that is, if it is determined that the received information is air-conditioning information, then control is passed to step 407, the correspondence to the transmitted ID of the distribution base 40-*i* is maintained, and the transmitted air-conditioning information and the date and time information (indicating the obtaining date and time of the air-conditioning information) obtained in step 400 are stored in the distribution information storage unit 701-*i*, thereby terminating the processing.

The air-conditioning information is specific to the distribution base 40-*i*, but is not the information specific to each distribution case 30. Therefore, no information on the case ID of the distribution case 30 is transmitted. Thus, the distribution tracking unit 700-*i* stores the received air-conditioning information at the entry of the distribution information storage unit 701-*i* having the transmitted ID of the distribution base 40-*i*.

Thus, the distribution tracking unit 700-*i* provided for the distribution management center 70-*i* receives the information transmitted from the distribution notification unit 406-*i* provided for the distribution base 40-*i*, thereby storing the information as shown in FIG. 9 in the distribution information storage unit 701-*i*.

Figure 24:
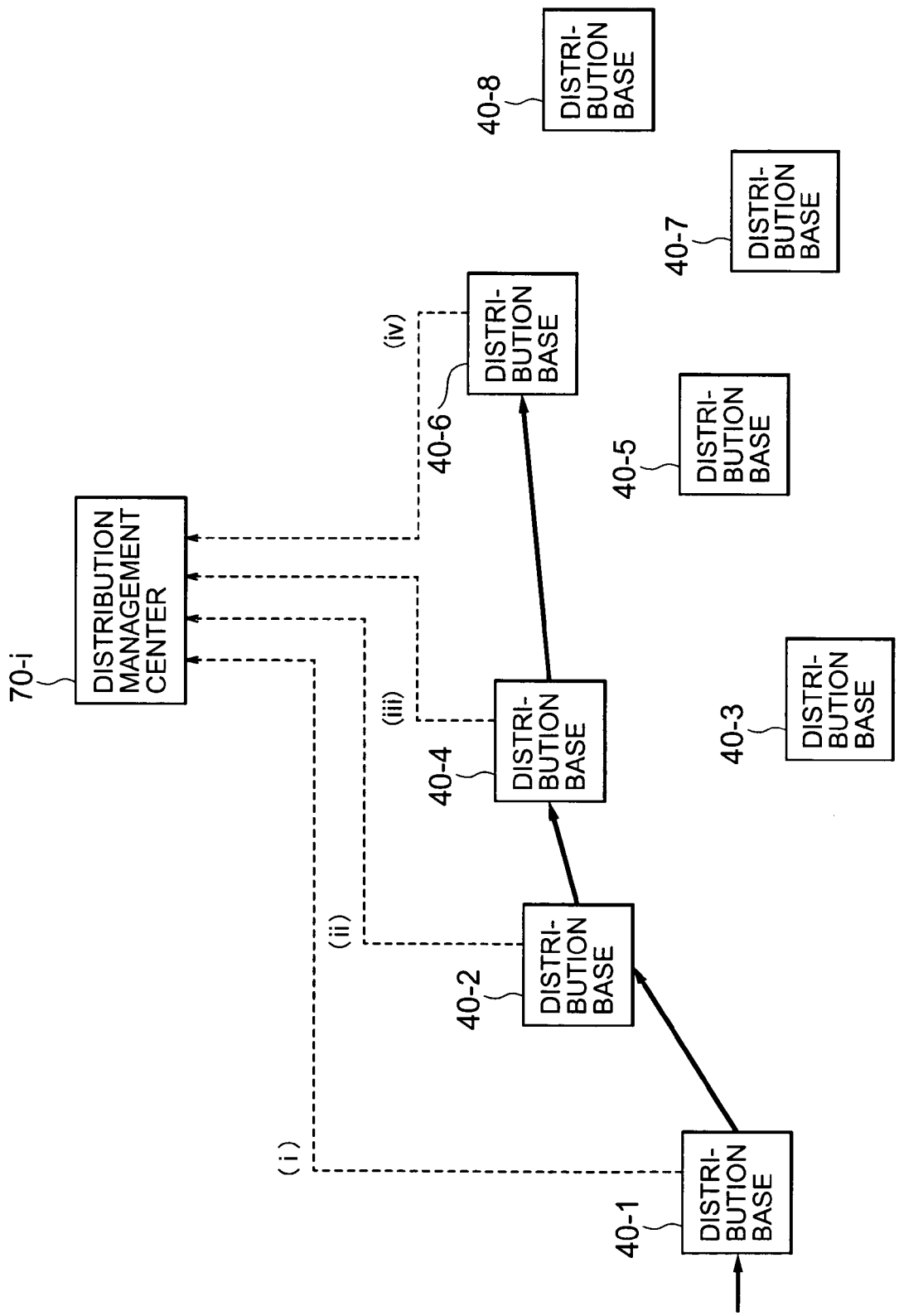
FIG. 24 shows the processing performed by the distribution tracking unit of a distribution management center.

According to the information stored in the distribution information storage unit 701-*i*, the distribution tracking unit 700-*i* can immediately obtain in real time the distribution base 40-*i* currently storing each distribution case 30 as shown in FIG. 24, and can also obtain immediately the information on the distribution bases 40-*i* through which each distribution case 30 has passed. The information on the distribution base 40-*i* currently storing the distribution case 30 can be obtained by designating the distribution base 40-*i* for which the incoming date and time is stored, and no outgoing date and time is stored.

That is, in the example shown in FIG. 24, (i) the distribution base 40-1 informs of the storage from May 20 at 14:00 to May 23 at 10:45; (ii) the distribution base 40-2 informs of the storage from May 23 at 11:00 to May 25 at 14:15; (iii) the distribution base 40-4 informs of the storage from May 25 at 14:25 to May 26 at 13:10; and (iv) the distribution base 40-6 informs of the storage from May 26 at 13:20. Then, the distribution tracking unit 700-*i* can be immediately informed of the first storage by the distribution base 40-1, and then by the distribution bases 40-2 and 40-4, and currently by the distribution base 40-6.

Furthermore, when the distribution base 40-*i* which is the preceding storage and the distribution base 40-*i* which is the current storage are mobile, the distribution tracking unit 700-*i* can immediately obtain the moving route according to the periodically transmitted GPS information.

Thus, in response to a request of a user, the distribution tracking unit 700-*i* can present a user in real time the distribution status of the user-requested distribution case 30 by presenting the obtaining result by displaying it on, for example, a map at a request of the user.

Furthermore, since the distribution tracking unit 700-*i* obtains the air-conditioning information periodically transmitted from the distribution bases 40-*i* which are the preceding and current storage portions, the storage history of the air-conditioning information can also be immediately obtained according to the received information.

The above-mentioned functions of the distribution management center 70-*i* can be provided in the distribution base 40-*i*, the client terminal 60-*i*, or the quality management center 50-*i*. Furthermore, a plurality of electronic mail addresses can be recorded on the ID tag 300.

Thus, in the monitor processing for the distribution status to be realized by the functions of the distribution management center 70-*i*, the distribution base 40-*i* as the final storage of the distribution case 30 can be informed of the current progress of the distribution case 30, and the distribution base 40-*i* subsequent to the current base can correctly determine the preparation for the reception of the case.

(F) Verification Process on the Distribution Route Recorded on the ID Tag

The data of the distribution route is recorded on the ID tag 300 attached to the distribution case 30 to be distributed from a distribution base 40-*i* to another distribution base 40-*i* as shown in FIG. 21.

On the other hand, according to the electronic mail address recorded on the ID tag 300, the distribution route is reported in real time from the distribution base 40-*i* to the distribution management center 70-*i*.

Thus, it can be checked whether or not any illegal operation has been performed during the distribution by checking whether or not the distribution routes recorded in the above-mentioned two methods match each other.

The verification process on the distribution route is performed by, for example, the quality control unit 500-*i* of the quality management center 50-*i* having the function of analyzing the distribution route recorded on the ID tag 300.

That is, when the verification process is performed on the distribution route by the quality control unit 500-*i* of the quality management center 50-*i*, it can be checked whether or not any illegal operation has been performed during the distribution by: (i) receiving the information on the distribution route notified according to the electronic mail address recorded on the ID tag 300 from the distribution tracking unit 700-*i* of the distribution management center 70-*i*, and comparing the received information on the distribution route with the information on the distribution route recorded on the ID tag 300; and (ii) comparing the information on the distribution route addressed to the distribution management center 70-$i$ according to the electronic mail address recorded on the ID tag 300 with the information on the distribution route recorded on the ID tag 300.

Figure 25:
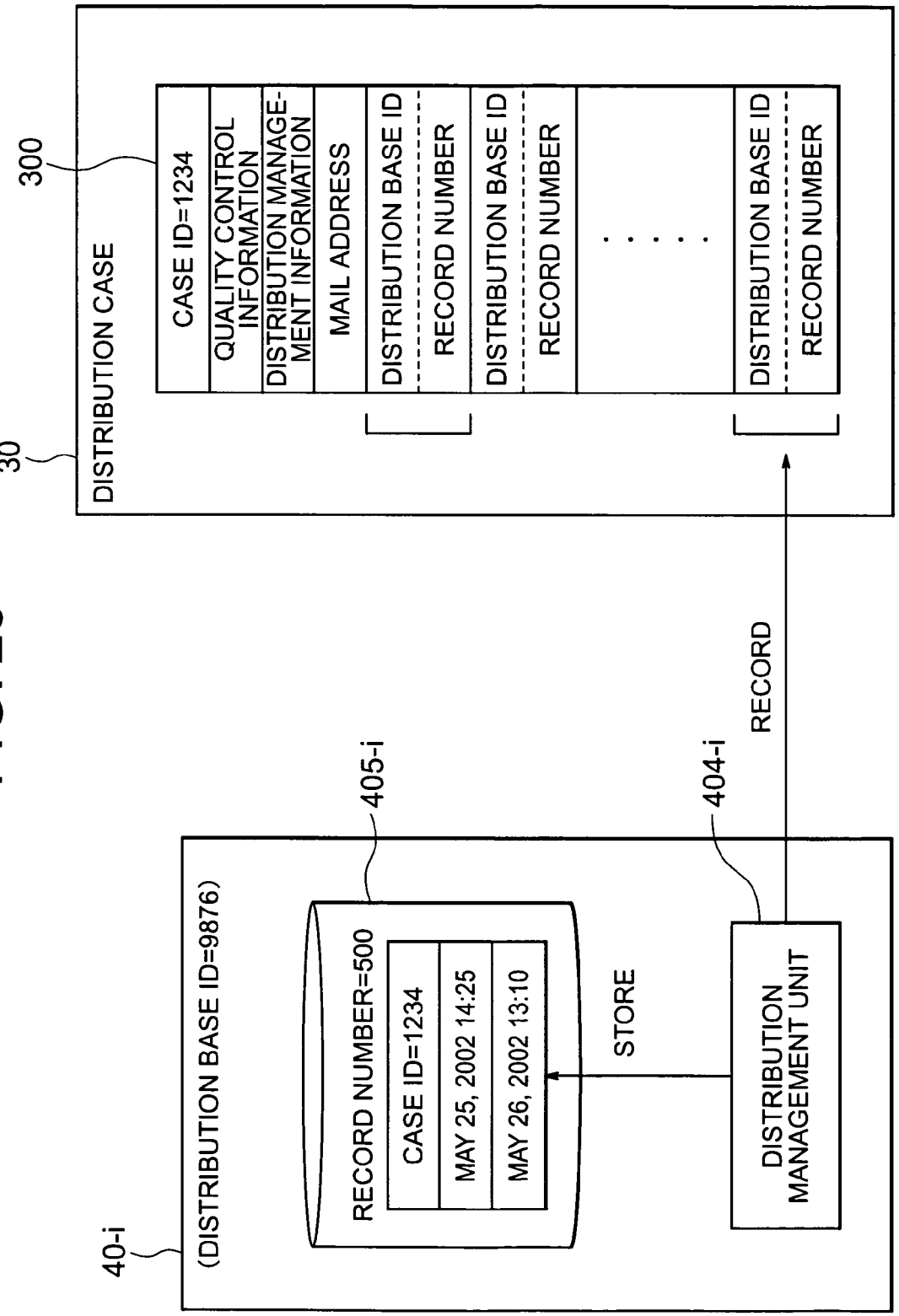
FIG. 25 shows the processing performed by the distribution management unit of a distribution base.

In the above-mentioned embodiment, as shown in FIG. 21, the incoming date and time/outgoing date and time indicating the storage period is recorded on the ID tag 300 while maintaining the correspondence to the ID of the distribution base 40-$i$ which is the storage of the distribution case 30. Since the incoming date and time/outgoing date and time is stored in the distribution information storage unit 405-$i$ of the distribution base 40-$i$, the present invention can be realized also by recording information such as a record number indicating the storage position instead of the incoming date and time/outgoing date and time as shown in FIG. 25.

In this case, the quality control unit 500-$i$ requests the distribution base 40-$i$ to transmit the air-conditioning information with the information such as the record number, etc. specified.

In the above-mentioned embodiments, the present invention has been described with collecting of air-conditioning information as a practical example, but the present invention is not limited to the application of collecting air-conditioning information.

Additionally, in the above-mentioned embodiments, the present invention is described according to the application to a process in which the flow of process steps dynamically changes depending on the type of product and the status of process steps. However, the present invention can be applied to the process in which the flow of process steps does not change.

[4] Example of a Physical Distribution Tracking System Realized by the Present Invention Described below is an example of a physical distribution tracking system realized by the present invention. In the physical distribution tracking system, a readable/writable record medium is used as a tag to be attached to a package.

According to the structure of the present invention, the physical distribution tracking system comprises a distributed data collection terminal, a display terminal, a tag attached to a package, the GPS for obtaining position information, a map database, a database for providing information such as a predicted arrival time of transportation means and the traffic congestion status of transportation means, and the Internet. Thereby, the system can be easily configured as a small to large system at a low cost.

That is, the basic structure is formed by a tag to be attached to a package, a distributed data collection terminal for reading and writing tag information, and a display terminal for obtaining or receiving tracking information.

A data collection terminal is provided for a package collecting and distributing base, a transportation truck as transportation means, a container, a vehicle, a ship, a plane, etc., and has a GPS antenna to obtain the position of its own on the earth. Furthermore, it also comprises communications means such as a telephone line for communications with the Internet. Furthermore, it also has a sensor for detection of the environment of the site, a tag reader/writer, etc. for reading and writing of tag information. Furthermore, the data indicating the characteristics of the terminal can be stored.

On the other hand, the display terminal comprises communications means such as a telephone line so that communications can be established with the Internet, means for obtaining data from the data collection terminal; means for obtaining the map information for displaying the data to be understood easily, and means for obtaining data for predicting an estimated arrival time.

Furthermore, the display terminal has a tag reader for obtaining data indicating a route, a route passage time, the characteristic of the package stored in the tag attached to a package. The map information, the GPS information, the information of estimating the arrival time by the transportation means used here are operated by other systems, and can be available through the Internet.

The member configuring the physical distribution tracking system can be a transmitter for transmitting a package, a collector for receiving a package, a transporter for transporting a package, a storer for temporarily storing a package, a receiver who receives a package, a deliverer for performing a delivery service, etc.

Each configuring member is assigned an ID for identification such as an electronic mail address, etc. Each configuring member can be an existing person or a mechanical vehicle or a warehouse, but refers to a place in information equipment such as a computer attached to each configuring member. Therefore, the ID refers to a place identified in each information equipment.

The transmitter of a package writes the ID of the package, the data indicating the characteristics of the package, the ID of the transmitter, the ID and data for designation of the address of the correspondent, the requested time data for arrival at a communications partner, etc. to the tag to be attached to a package at the time of shipment of the package.

The collector of a package receives the package, and writes to the tag attached to the package the ID of the collector, the collection time, the data for designation of the collector, etc. for confirmation of collecting the package. Simultaneously, it reads the data written on the tag. At this time, the collector transmits to the receiver who receives the package the package reception time, and the data written to the tag through the Internet. The similar information is also transmitted to the person involved in the transportation of the package.

The person involved in the transportation of the package prepares for the optimum transportation of the package according to the obtained information with each role taken into account. The preparation includes the transportation means, the route, the price, the estimation of the arrival time, etc. with the request of the transmitter taken into account for the cost, the time, the quality of transportation, etc. Based on the result, the person involved in the transportation of the package prepared for his/her roles. The person involved notifies the transmitter of the information such as the transportation price, the predicted arrival time, etc., and notifies the person who receives the package of the information such as the predicted arrival time, the contents of the package, etc.

Furthermore, the transporter prepares for a vehicle, etc., the storer prepares for storage space, and the deliverer prepares for the transportation quality tracking, etc.

When the collector passes the package to the transporter, the collector reads the tag information, and records the outgoing time from the collector on the data collection terminal. Simultaneously, the information on the outgoing package is transmitted to a person involved.

On the other hand, the transporter records the package reception time on the tag, and writes the ID of the transporter, the reception time, the data designating the transporter, etc. to confirm the reception by the transporter. Simultaneously, the transporter reads the data written on the tag. At this time, the transporter transmits to the person involved in the transportation of the package the data including the package reception time and the contents written to the tag.

When the transporter reaches the destination, the temporary storer, a different transporter, and the person who receives the package communicate data with one another in the similar method. The processing continues until the package reaches the receiver.

Thus, the person involved and the receiver can be constantly informed of the latest arrival time, thereby optimally preparing for reception.

If the actual route information on a tag is written to the tag, there can be falsification on the data. However, receiver reads the data of the tag when the package is received, and checks whether or not the transmitted information matches the route information written on the tag, thereby checking the possible falsification, and confirming the package addressed to the receiver being from the correct transmitter.

When the tag information is read, the information that the receiver has received the package is transmitted to the person involved including the transmitter, thereby issuing a notification of the completion of the transportation, and completing the processing.

Furthermore, when the position information is obtained, the route and the current position of the package can be displayed on the map. At this time, the current position of the package can be checked by providing the GPS for the mobile data collection terminal. When a transportation information system such as the VICS (vehicle information and communication system) and a transportation route prediction system for presentation of a transfer information, a predicted arrival time of the package can be presented.

The physical distribution tracking system of the present invention has the following characteristics.

That is, since the system is very simple, it is not costly for structuring the system. Additionally, since the transportation route can be correctly obtained, a person involved in the transportation of the package can make preparations in advance, thereby minimizing the delivery cost. Furthermore, since the transportation route can be confirmed, and the responsibility of the persons involved in the transportation can be clarified thus clarifying who is responsible for a trouble during transportation. Additionally, the correct arrival time of the package can be given as a client service, and a suspicious package can be removed, which can be an advantage also for the persons involved in the transportation.

If there occurs trouble on the package during the transportation, the responsibility of the persons involved in the transportation can be clarified. Therefore, the claims can be appropriately responded. Furthermore, since the route and the position of the package during the transportation can be presented, the addressee of the package can easily locate the package, and also can estimate the delay of the transportation although the package is delayed by any trouble such as traffic congestion, etc. Additionally, the trouble of missing the package can be avoided.

[5] Another Application of the Present Invention

In the above-mentioned embodiments, the present invention is described by assuming a distribution process. However, the present invention can also be applied to a process other than a distribution process. For example, it can be applied as is to the production process of a semiconductor, etc. as shown in FIG. 26.

The present invention is specifically effective in the above-mentioned production process in which the processing device at the subsequent stage is dynamically changed by, for example, selecting the processing device at the subsequent stage depending on the wait state, etc.

The present invention is also effective when it is applied to a production line of cars, etc. For example, in the production of cars, upon receipt of an order from a client, the order reception number and data are transmitted to the production management division of the manufactory. The production management division adds the information such as the property of the client, the requested delivery date, the information on the sales store, etc. and activates the production line.

In each process step, a data collection terminal is provided, and an ID tag is added to each car to be produced.

At this time, the activation of the production line is transmitted to the subsequent process steps of the production line like the information from the transmitter in the above-mentioned physical distribution tracking system. Furthermore, the information is also transmitted to the related divisions of the parts manufacturers. Simultaneously, the information is also transmitted to the deliverer, the sales shop, and the client. Similarly, when the car is put to each process step, the information is transmitted to the subsequent process steps, the transportation vehicles, the sales shop, the client, etc. in the similar method, thereby allowing them to be well informed of the process steps and make appropriate preparations.

In each process step, necessary preparations can be made with the predicted schedule taken into account by estimating it. If any trouble occurs during the production or transportation, the timely information can be transmitted and appropriate action can be taken in real time.

Thus, according to the present invention, the tracking can be appropriately performed from the production line to the client. The present invention is applied to various production systems such as a production on order system, a custom-made system, etc. Using the present invention, the quality can be greatly improved, and the production cost can be minimized.

INDUSTRIAL APPLICABILITY

As described above, according to the present invention, the processing history of the product in a process in which the flow of process steps dynamically changes depending on the type of product and the status of process steps can be easily obtained.

According to the present invention, when it is necessary in the above-mentioned process to adjust the processing performed on the product based on the processing history in the preceding process step, the processing history in the preceding process step can be easily obtained.

Then, according to the present invention, in the above-mentioned process, the current process step in which the product is being handled, and the process steps through which the product to be tracked has passed can be easily obtained.

According to the present invention, as for the product in a process in which the flow of process steps dynamically changes depending on the type of product and the status of process steps, and in which the flow speed dynamically changes, the current processing performed on each product, the current status of each product, the processing performed on the product in the preceding process step, and the preceding status of the product can be obtained in real time.

Thus, in the subsequent process steps, the status of each product can be obtained in real time, and the preparations for reception of the product can be efficiently made.

The invention claimed is:

1. A process step management apparatus provided corresponding to a process step in which a product handled in a preceding process step is input and then output after predetermined processing, the apparatus comprising:

a storage device storing processing information in the process step corresponding thereto, the processing information being a part of information for management of the process step corresponding thereto;

means for detecting input of a product to a process step which is managed by the process step management apparatus, the product having an attached record medium that records product identification information, the product identification information being another part of the information for management of the process step corresponding thereto;

means for detecting output of the product from the process step which is managed by the process step management apparatus;

means for obtaining date and time information on the input of the product and date and time information on the output of the product;

means for reading the product identification information recorded on the record medium attached to the product;

means for storing the read product identification information and the obtained date and time information on the input and output in the storage device, the read product identification information and the obtained date and time information maintaining a correspondence with each other; and means for recording the obtained date and time information on the input and output and identification information on the process step management apparatus in the record medium, the obtained date and time information and identification information maintaining a correspondence with each other, wherein the recording the obtained date and time information on the input and output and identification information on the process step management apparatus in the record medium comprises:

a first recording of information on the record medium at a first process step, and a second recording of information on the record medium at a second process step after a reading of the first recording of information.

2. A process step management apparatus provided corresponding to a process step in which a product handled in a preceding process step is input and then output after predetermined processing, the apparatus comprising:

a storage device storing processing information in the process step corresponding thereto, the processing information being a part of information for management of the process step corresponding thereto;

means for detecting input of a product to a process step which is managed by the process step management apparatus, the product having an attached record medium that records product identification information, the product identification information being another part of the information for management of the process step corresponding thereto;

means for detecting output of the product from the process step which is managed by the process step management apparatus;

means for obtaining date and time information on the input of the product and date and time information on the output of the product; and means for reading the product identification information recorded on the record medium attached to the product;

means for storing the read product identification information and the obtained date and time information on the input and output in the storage device, the read product identification information and the obtained date and time information maintaining a correspondence with each other; and means for recording the obtained date and time information on the input and output, address information of the information stored in the storage device, and identification information on the process step management apparatus in the record medium, the address information and identification information maintaining a correspondence with each other, wherein the recording the obtained date and time information on the input and output and identification information on the process step management apparatus in the record medium comprises:

a first recording of information on the record medium at a first process step, and a second recording of information on the record medium at a second process step after a reading of the first recording of information.

3. The process step management apparatus according to claim 2, further comprising:

means for reading device identification information and the address information on a preceding process step recorded on the record medium; and means for obtaining the processing information in the preceding process step performed on the product input to the process step which is managed by the process step management apparatus by making inquiries in which the read address information is specified to a process step management apparatus pointed to by the read device identification information.

4. The process step management apparatus according to claim 1, further comprising:

means for returning the date and time information when inquiry request is issued with product identification information specified, the date and time information on a product pointed to by the product identification information being stored in the storage device.

5. The process step management apparatus according to claim 1, further comprising:

means for reading destination address information recorded on the record medium; and means for notifying one or a plurality of devices pointed to by the read destination address information of the identification information on the process step management apparatus and input and output of the product pointed to by the product identification information.

6. A product information collecting apparatus for collecting processing information on a product passing through a plurality of process steps, the apparatus comprising:

means for reading, when a product, having an attached record medium, is being processed, identification information of a process step management apparatus corresponding to a process step, and date and time information on an input and an output of the product in the process step or storage information of the date and time information from the record medium, the record medium recording enumerated data including the identification information of the process step management apparatus and the date and time information or the storage information of the date and time information, the process step management apparatus having a storage device storing processing information in the process step corresponding thereto, the stored processing information being a part of information for management of the process step corresponding thereto and the product identification information recording on the record medium being another part of the information for management of the process step corresponding thereto; and means for collecting the processing information performed on the product in the process step, the product passed by issuing inquires to the process step management apparatus pointed to by the read device identification information with the read date and time information or the storage information of the information specified, wherein the recording the obtained date and time information on the input and output and identification information on the process step management apparatus in the record medium comprises:

a first recording of information on the record medium at a first process step, and a second recording of information on the record medium at a second process step after a reading of the first recording of information.

7. The product information collecting apparatus according to claim 6, further comprising:

means for comparing time-series data of identification information on a plurality of process step management apparatuses read from the record medium with time-series data of identification information on a plurality of process step management apparatuses transmitted from destination address information recorded on the record medium.

8. A process step tracking apparatus for tracking a plurality of process steps through which a product passes, the apparatus comprising:

means for collecting information whether or not a product to be tracked is handled by issuing inquiries to a process step management apparatus with identification information on the product to be tracked specified, the apparatus being provided corresponding to each process step and storing date and time information on an input and an output of the product in the process step, the date and time information corresponding to identification information on the handled product, and collecting the date and time information when the product is handled, the process step management apparatus having a storage device storing processing information in the process step corresponding thereto, the processing information being a part of information for management of the process step corresponding thereto;

means for designating information on a current process step in which the product to be tracked is being handled and/or information on an order of process steps through which the product to be tracked passes according to the collected information, and means for recording an obtained date and time information on the input and output and identification information on the process step management apparatus in the record medium comprising:

means for a first recording of information on the record medium at a first process step, and means for a second recording of information on the record medium at a second process step after a reading of the first recording of information.

9. The process step tracking apparatus according to claim 8, wherein the collecting means collects the processing information on the product to be tracked and designated according to the date and time information from each of a plurality of process step management apparatuses from which the date and time information is collected.

10. A process step management apparatus provided corresponding to a process step in which a product handled in a preceding process step is input and then output after predetermined processing, the apparatus comprising:

means for detecting input of a product to a process step which is managed by the process step management apparatus;

means for detecting output of the product from the process step which is managed by the process step management apparatus;

means for reading identification information on the product and destination address information, both recorded on a tag attached to the product, the product identification information being a part of the information for management of a process step corresponding thereto;

means for notifying one or a plurality of devices pointed to by the destination address information of input and output of the product pointed to by the identification information on the product and identification information on the process step management apparatus, and means for recording an obtained date and time information on the input and output and identification information on the process step management apparatus in a record medium comprising:

means for a first recording of information on the record medium at a first process step, and means for a second recording of information on the record medium at a second process step after a reading of the first recording of information.

11. The process step management apparatus according to claim 10, wherein the notification means notifies a device pointed to by the destination address information of position information on the process step management apparatus according to a predetermined notification code in a period from input to output of the product.

12. The process step management apparatus according to claim 10, wherein the notification means notifies a device pointed to by the destination address information of processing information on the process step management apparatus according to a predetermined notification code in a period from input to output of a product.

13. A process step tracking apparatus for tracking a plurality of process steps through which a product passes, the apparatus comprising:

means for receiving information which is transmitted from a process step management apparatus and includes identification information on a product and identification information on the process step management apparatus, the receiving means being connected to the process step management apparatus through a network, the process step management apparatus being provided corresponding to a process step, reading the identification information on the product and destination address information which are recorded on a tag attached to the product and notifying an input and an output of the product pointed to by the identification information on the product, the identification information on the product being a part of the information for management of a process step corresponding thereto;

means for tracking a process step through which the product pointed to by the identification information on the product on a basis of time-series data of the identification information on the product, the identification information on the process step management apparatus and pair of the date and time information on the input and the output, and means for recording an obtained date and time information on input and output and identification information on the process step management apparatus in a record medium comprising:
  means for a first recording of information on the record medium at a first process step, and
  means for a second recording of information on the record medium at a second process step after a reading of the first recording of information.

14. The process step tracking apparatus according to claim 13, wherein the tracking means tracks a moving route of the product according to time-series data of position information when a plurality of the position information is transmitted from a plurality of process step management apparatuses.

15. The process step tracking apparatus according to claim 13, wherein the tracking means tracks contents of processing on the product according to time-series data of processing information when a plurality of the processing information is transmitted from a plurality of process step management apparatuses.

16. The process step management apparatus according to claim 1, further comprising:
  means for reading device identification information and date and time information on a preceding process step recorded on the record medium; and
  means for obtaining processing information in the preceding process step performed on the product input to the process step which is managed by the process step management apparatus by making inquiries in which the read date and time information is specified to a process step management apparatus pointed to by the read device identification information.

17. The process step management apparatus according to claim 2, further comprising:
  means for returning the date and time information when inquiry request is issued with product identification information specified, the date and time information on a product pointed to by the product identification information being stored in the storage device.

18. The process step management apparatus according to claim 16, further comprising:
  means for reading destination address information recorded on the record medium; and
  means for notifying one or a plurality of devices pointed to by the read destination address information of the identification information on the process step management apparatus and input and output of the product pointed to by the product identification information.

19. The process step management apparatus according to claim 2, further comprising:
  means for reading destination address information recorded on the record medium; and
  means for notifying one or a plurality of devices pointed to by the read destination address information of the identification information on the process step management apparatus and input and output of the product pointed to by the product identification information.

20. The process step management apparatus according to claim 3, further comprising:
  means for reading destination address information recorded on the record medium; and
  means for notifying one or a plurality of devices pointed to by the read destination address information of the identification information on the process step management apparatus and input and output of the product pointed to by the product identification information.

21. The process step management apparatus according to claim 4, further comprising:
  means for reading destination address information recorded on the record medium; and
  means for notifying one or a plurality of devices pointed to by the read destination address information of the identification information on the process step management apparatus and input and output of the product pointed to by the product identification information.

22. The process step management apparatus according to claim 17, further comprising:
  means for reading destination address information recorded on the record medium; and
  means for notifying one or a plurality of devices pointed to by the read destination address information of the identification information on the process step management apparatus and input and output of the product pointed to by the product identification information.

23. A process step management apparatus, comprising:
  a detector detecting an input and an output of a product from a processing and obtaining date and time information on the input of the product to the processing and on the output of the product from the processing;
  an input device reading product identification information recorded on a record medium attached to the product, the product identification information being a part of information for management of the process step corresponding thereto;
  a storage device storing information regarding the processing of the product, the read product identification information, and the obtained date and time information, the information regarding the processing being another part of the information for management of the process step corresponding thereto; and
  an output device recording the obtained date and time information and identification information on the process step management apparatus on the record medium attached to the product,
  wherein the recording the obtained date and time information and identification information on the process step management apparatus in the record medium comprises:
  a first recording of information on the record medium at a first process step, and
  a second recording of information on the record medium at a second process step after a reading of the first recording of information.

24. The process step management apparatus according to claim 1, wherein the record medium is a readable and repeatedly writeable record medium.

* * * * *